(12) United States Patent
Ashizaki et al.

(10) Patent No.: US 7,978,567 B2
(45) Date of Patent: Jul. 12, 2011

(54) OPTICAL DISC RECORDING AND REPRODUCING APPARATUS

(75) Inventors: Koji Ashizaki, Tokyo (JP); Takahiro Toyoda, Tokyo (JP); Satoshi Kitani, Tokyo (JP)

(73) Assignee: Sony Corporation, Tokyo (JP)

( * ) Notice: Subject to any disclaimer, the term of this patent is extended or adjusted under 35 U.S.C. 154(b) by 1217 days.

(21) Appl. No.: 11/614,397

(22) Filed: Dec. 21, 2006

(65) Prior Publication Data

US 2007/0183271 A1 Aug. 9, 2007

(30) Foreign Application Priority Data

Jan. 10, 2006 (JP) ................................. 2006-002513

(51) Int. Cl.
*G11B 13/00* (2006.01)
(52) U.S. Cl. .......................... 369/14; 455/272; 455/575.7
(58) Field of Classification Search .................... 369/14; 455/272, 575.7, 132
See application file for complete search history.

(56) References Cited

U.S. PATENT DOCUMENTS

| | | | | |
|---|---|---|---|---|
| 5,787,340 A | * | 7/1998 | Sepponen | 455/575.5 |
| 2004/0227055 A1 | * | 11/2004 | Hausberger et al. | 250/201.5 |
| 2005/0001712 A1 | * | 1/2005 | Yarbrough | 340/5.82 |
| 2005/0245224 A1 | * | 11/2005 | Kurioka | 455/272 |
| 2005/0270964 A1 | | 12/2005 | Ujino | |

FOREIGN PATENT DOCUMENTS

| | | |
|---|---|---|
| JP | 2000-57736 | 2/2000 |
| JP | 2000-268239 | 9/2000 |
| JP | 2001-196951 A | 7/2001 |
| JP | 2001-297568 A | 10/2001 |
| JP | 2004-328605 | 11/2004 |
| WO | WO 2004/006259 A1 | 1/2004 |

OTHER PUBLICATIONS

Office Action issued Nov. 16, 2010, in Japanese Patent Application No. 2006-002513.

* cited by examiner

*Primary Examiner* — Wiliam J Klimowicz
*Assistant Examiner* — Andrew J Sasinowski
(74) *Attorney, Agent, or Firm* — Oblon, Spivak, McClelland, Maier & Neustadt, L.L.P.

(57) ABSTRACT

The present invention provides an optical disc recording and reproducing apparatus having a function of communicating with a noncontact IC. The apparatus includes a chassis, an external antenna arranged for communication with a noncontact IC outside the chassis, an internal antenna arranged for communication with a noncontact IC included in an optical disc loaded in the chassis, a control section performing a search operation of searching for the noncontact IC outside the chassis and the noncontact IC in the optical disc, and a switching section changing conduction state between the external antenna and the control section and that between the internal antenna and the control section under the control of the control section.

15 Claims, 16 Drawing Sheets

OPTICAL DISC RECORDING AND REPRODUCING APPARATUS

CROSS REFERENCES TO RELATED APPLICATIONS

The present invention contains subject matter related to Japanese Patent Application JP 2006-002513 filed in the Japanese Patent Office on Jan. 10, 2006, the entire contents of which are incorporated herein by reference.

BACKGROUND OF THE INVENTION

1. Field of the Invention

The present invention relates to optical disc recording and reproducing apparatuses, and in particularly, to an optical disc recording and reproducing apparatus having a function of communicating with a noncontact integrated circuit (IC).

2. Description of the Related Art

As media capable of recording a large amount of data, various optical discs, such as read only memory (ROM) media, recordable media, and rewritable media, are becoming widespread.

Radio frequency identification (RFID) for authentication by noncontact communication is known. A noncontact IC card used in the RFID has the following features: Since communication between a noncontact IC chip and a data reader/writer is achieved without physical contact therebetween, processing time from the start of communication connection to the end thereof is short. The use of high-grade encryption and mutual authentication provide high-level security. Accordingly, noncontact IC cards each having an electronic money function are becoming widely available.

A recording medium including a noncontact IC chip and an optical disc on the same substrate is known as a medium having the combination of the features of the above-described optical disc and noncontact IC chip.

For example, Japanese Unexamined Patent Application Publication No. 8-161790 (Patent Document 1) discloses an optical disc mounting a noncontact IC chip. This chip is arranged in a central portion of the optical disc, i.e., on the periphery of a center hole through which a rotating shaft is inserted.

Japanese Unexamined Patent Application Publication No. 9-245381 (Patent Document 2) discloses an optical disc including two substrates. In this disc, a circuit unit and a coil unit are arranged in a clearance between recesses of the two substrates.

Japanese Unexamined Patent Application Publication No. 11-353714 (Patent Document 3) discloses an optical disc in which a reflecting film of the optical disc and an antenna coil of a noncontact IC chip are made of the same material by vapor deposition and sputtering.

Japanese Unexamined Patent Application Publication No. 2001-319380 (Patent Document 4) discloses an optical disc including a noncontact IC chip and an antenna coil arranged in a region between a lead-in area of the optical disc and the inner periphery thereof. In this optical disc, a notch is formed on a reflecting film in the vicinity of the inner periphery in order to avoid a phenomenon in which a communication distance is reduced by the reflecting film near the inner periphery because the IC chip and the antenna coil are disposed on the reflecting film. The notch reduces an effect on electromagnetic induction produced by the antenna coil.

Further, there is known an optical disc recording and reproducing apparatus compatible with the above-described recording media each including a noncontact IC chip and an optical disc on the same substrate. The apparatus has an optical-disc recording and reproducing function and a communication function of communicating with a noncontact IC chip. For example, Japanese Unexamined Patent Application Publication No. 2001-297568 (Patent Document 5) discloses such an apparatus including an internal antenna and an external antenna. Those antennas are connected in parallel to radio frequency circuits, respectively. The apparatus is capable of communicating with noncontact IC chips which are close to the respective antennas.

SUMMARY OF THE INVENTION

In optical disc recording and reproducing apparatuses each having a function of communicating with an optical disc mounting a noncontact IC, it is preferred to communicate with a noncontact IC mounted on an optical disc during reproducing of data recorded on the optical disc or recording of data on the optical disc, alternatively, during intervals between reproducings or recordings. The reason is that information unique to each optical disc or information unique to each noncontact IC chip can be checked during reproducing, recording, or intervals between reproducings or recordings. The unique information is used as copyright protection information.

If an optical disc recording and reproducing apparatus has internal and external antennas like the apparatus described in Patent Document 5, it is necessary to determine whether a noncontact IC currently communicating with the apparatus is mounted on an optical disc loaded in the apparatus or is positioned outside the apparatus in terms of counterfeiting prevention in handling copyright protection information.

Unfortunately, the apparatus disclosed in Patent Document 5 does not determine whether a noncontact IC currently communicating with the apparatus is close to the internal antenna or the external antenna.

The present invention is made in consideration of the above-described problem. It is desirable to provide an optical disc recording and reproducing apparatus capable of determining whether a noncontact IC currently communicating with the apparatus is close to an internal antenna or an external antenna.

According to an embodiment of the present invention, there is provided an optical disc recording and reproducing apparatus having a function of communicating with a noncontact IC. The apparatus includes a chassis, an external antenna arranged for communication with a noncontact IC outside the chassis, an internal antenna arranged for communication with a noncontact IC included in an optical disc loaded in the chassis, a control section performing a search operation of searching for the noncontact IC outside the chassis and the noncontact IC in the optical disc, and a switching section changing conduction state between the external antenna and the control section and that between the internal antenna and the control section under the control of the control section.

In the optical disc recording and reproducing apparatus according to this embodiment, while the control section performs the search operation of searching for the noncontact IC outside the chassis and the noncontact IC in the optical disc, the switching section changes the conduction state between the external antenna and the control section and that between the internal antenna and the control section under the control of the control section.

According to this embodiment, whether the noncontact IC communicating with the apparatus is close to the internal antenna or the external antenna can be determined through the one control section. Thus, the structure of the apparatus can be simplified, leading to a reduction in cost.

Particularly, when the control section performs communication with a noncontact IC outside the chassis and that with a noncontact IC in an optical disc such that the communication is associated with the other one, descriptions of unique information contained in the noncontact IC outside the chassis can be easily checked against descriptions of unique information contained in the noncontact IC included in the optical disc.

DESCRIPTION OF THE PREFERRED EMBODIMENTS

An embodiment of the present invention will be described in detail below with reference to the drawings.

Figure 1:
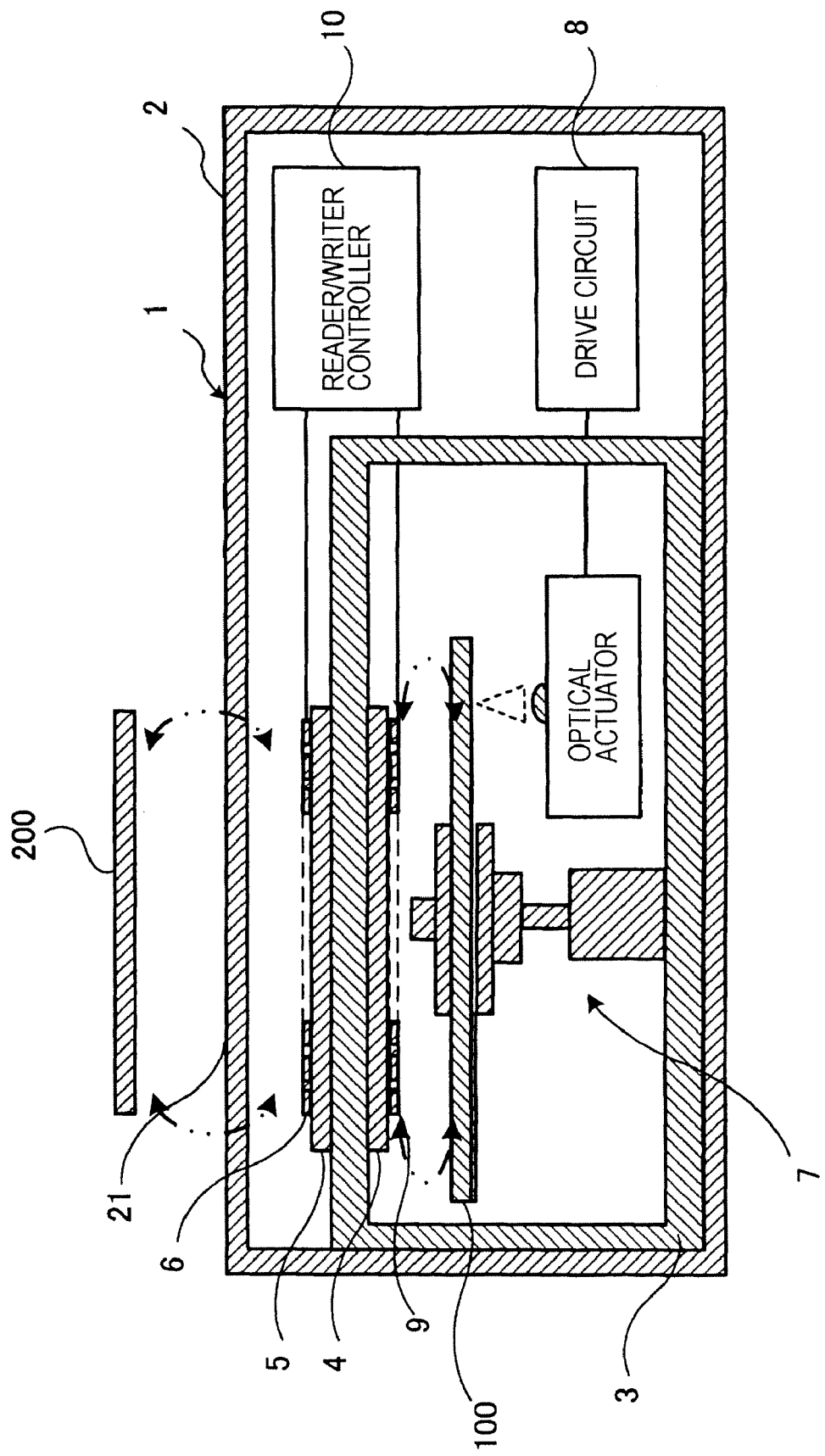
FIG. 1 is a cross-sectional view showing an optical disc recording and reproducing apparatus.

FIG. 1 is a cross-sectional view of an optical disc recording and reproducing apparatus. In the following description, upper, lower, left, and right parts of FIG. 1 will be called "upper", "lower", "left", and "right", respectively.

An optical disc recording and reproducing apparatus 1 is an apparatus for recording content, such as audio data, still image data, and/or moving image data, on an optical recording surface of an optical disc 100 loaded in the apparatus 1 and for reproducing content, such as audio data, still image data, and/or moving image data, recorded on the optical recording surface of the optical disc 100 loaded therein. The optical disc recording and reproducing apparatus 1 communicates with an IC chip (RFID chip) arranged in the optical disc 100 and an IC chip (RFID chip) disposed in a noncontact IC card 200 by inductive coupling.

In the following description, it is assumed that the optical disc recording and reproducing apparatus 1 communicates with the noncontact IC card 200 using electromagnetic waves having a frequency of 13.56 MHz and ISO/IEC 14443 (JIS X6322) is used as a communication standard.

The optical disc recording and reproducing apparatus 1 has a chassis 2, a casing 3 disposed in the chassis 2, high magnetic-permeability materials (high permeability materials) 4 and 5 arranged inside and outside the casing 3 so as to sandwich a part of the casing 3 therebetween, an external antenna 6 disposed on the high permeability material 5, an optical disc drive 7 arranged in the casing 3, a drive circuit 8 for driving the optical disc drive 7, an internal antenna 9 on the high permeability material 4, and a reader/writer controller 10. The reader/writer controller 10 allows the external antenna 6 to generate a predetermined magnetic field to communicate with the IC chip in the noncontact IC card 200 in a noncontact manner and allows the internal antenna 9 to generate a predetermined magnetic field to communicate with the IC chip in the optical disc 100 in a noncontact manner.

FIG. 1 shows a state in which the optical disc 100 is loaded in the optical disc recording and reproducing apparatus 1.

The chassis 2 is made of a material that has no influence on a magnetic field penetrating into the chassis 2 and that coming out thereof. The material for the chassis 2 is not limited. For example, a polymeric material may be used. The chassis 2 further has a card presentation portion 21 on an outer wall in the vicinity of the external antenna 6. The card presentation portion 21 indicates a position where the noncontact IC card 200 approaches the apparatus. The card presentation portion 21 may be omitted.

The casing 3 exhibits no magnetic permeability. In other words, the casing 3 intercepts the magnetic fields coming into and out of the casing 3. A material of the casing 3 is not particularly limited. For example, the casing 3 may be made of metal.

Each of the high permeability materials 4 and 5 is made of a sheet-shaped material exhibiting a high relative magnetic permeability and a low magnetic resistance. The lines of magnetic force generated from the internal antenna 9 and the external antenna 6 flow along the high permeability materials 4 and 5, respectively, thus producing a shielding effect. In other words, in order to avoid a phenomenon in which the casing 3 obstructs electromagnetic waves radiated from the external antenna 6 and the internal antenna 9, the high permeability material 4 is arranged between the internal antenna 9 and the casing 3 and the high permeability material 5 is arranged between the external antenna 6 and the casing 3, thus allowing the radiation. A material of each of the high permeability materials 4 and 5 is not particularly limited. For example, permalloy may be used.

The external antenna 6 includes a loop coil made of one or more turns of wire wound concentrically or spirally.

When the noncontact IC card 200 exists in a predetermined region above the chassis 2 (for example, within a 10 cm), the reader/writer controller 10 of the optical disc recording and reproducing apparatus 1 communicates with the noncontact IC card 200.

Figure 2:
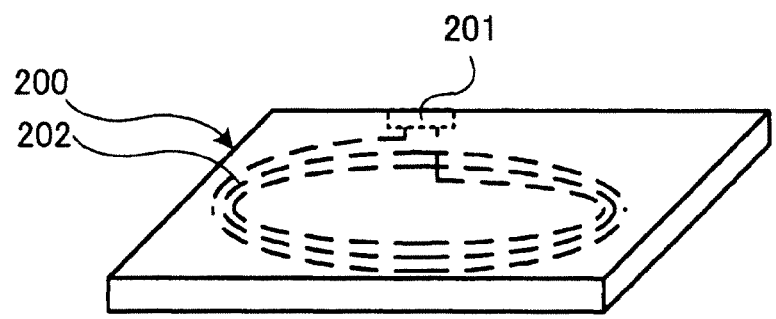
FIG. 2 is a perspective view of a noncontact IC card.

FIG. 2 is a perspective view of the noncontact IC card 200.

The noncontact IC card 200 has an IC chip (RFID chip) 201 including a memory device and an antenna coil 202 electrically connected to the IC chip 201. The IC chip 201 stores, for example, information regarding details of a transaction for content. The reader/writer controller 10 can add, delete, and overwrite the information stored in the IC chip 201 through the external antenna 6. The IC chip 201 can store various pieces of information, e.g., information unique to the IC chip 201 and copy protect information. The IC chip 201 is not intended to be limiting. For example, a Felica (registered trademark) chip or a Mifare (registered trademark) chip may be used. The memory device is not intended to be limiting. Examples of the memory device include an electronically erasable and programmable read only memory (EEPROM), a static random access memory (SRAM), and a ferroelectric random access memory (FeRAM).

Figure 3:
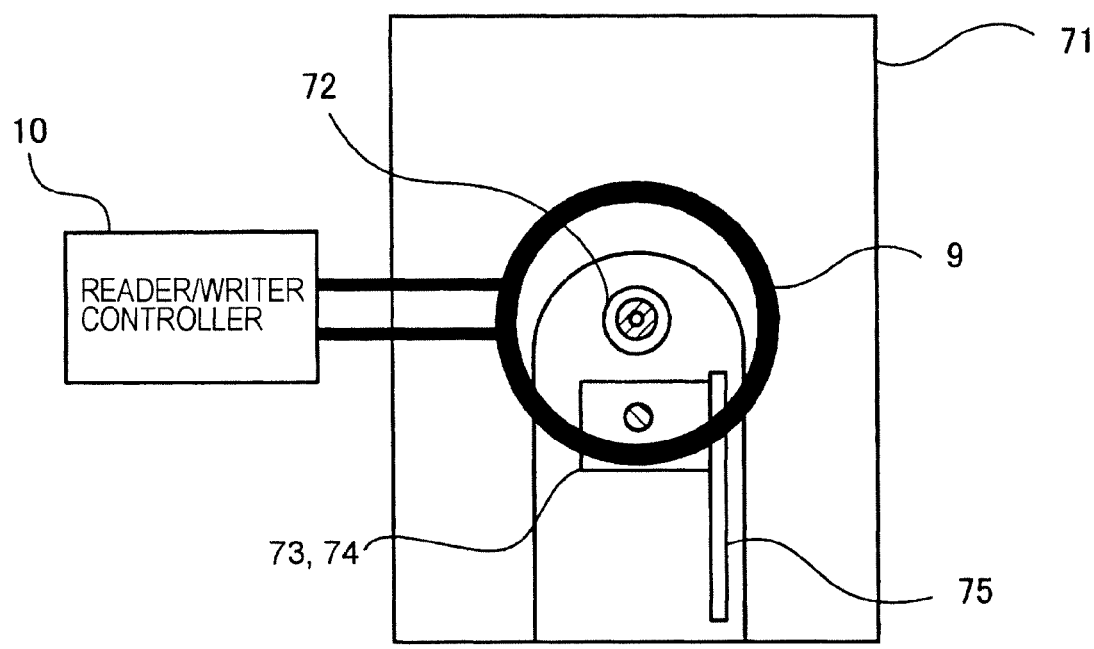
FIG. 3 is a plan view showing the positional relationship between an optical disc drive and an antenna coil.

FIG. 3 is a plan view showing the positional relationship between the optical disc drive 7 and the antenna coil 202.

The optical disc drive 7 includes a spindle mechanism 72, an optical actuator 74, and a thread 75. The spindle mechanism 72 rotates the optical disc 100 mounted on a disc tray 71. The optical actuator 74 includes an optical pickup module 73 for reading information recorded on the optical disc 100 and/or writing information on the optical disc 100 using light by focusing control and tracking control. The optical pickup module 73 is moved in the radial direction of the optical disc through the thread 75.

To load or unload the optical disc 100 to/from the chassis 2, the disc tray 71 is moved upward or downward in FIG. 3 (rightward or leftward in FIG. 1).

The internal antenna 9 is disposed so as to face the disc tray 71. The internal antenna 9 includes a loop coil made of one or more turns of wire wound concentrically or spirally. In a state in which the optical disc 100 is loaded in the chassis 2, the center of the loop of the internal antenna 9 is approximately aligned with the axis of rotation of the optical disc 100, i.e., the center of the spindle mechanism 72.

Figure 4:
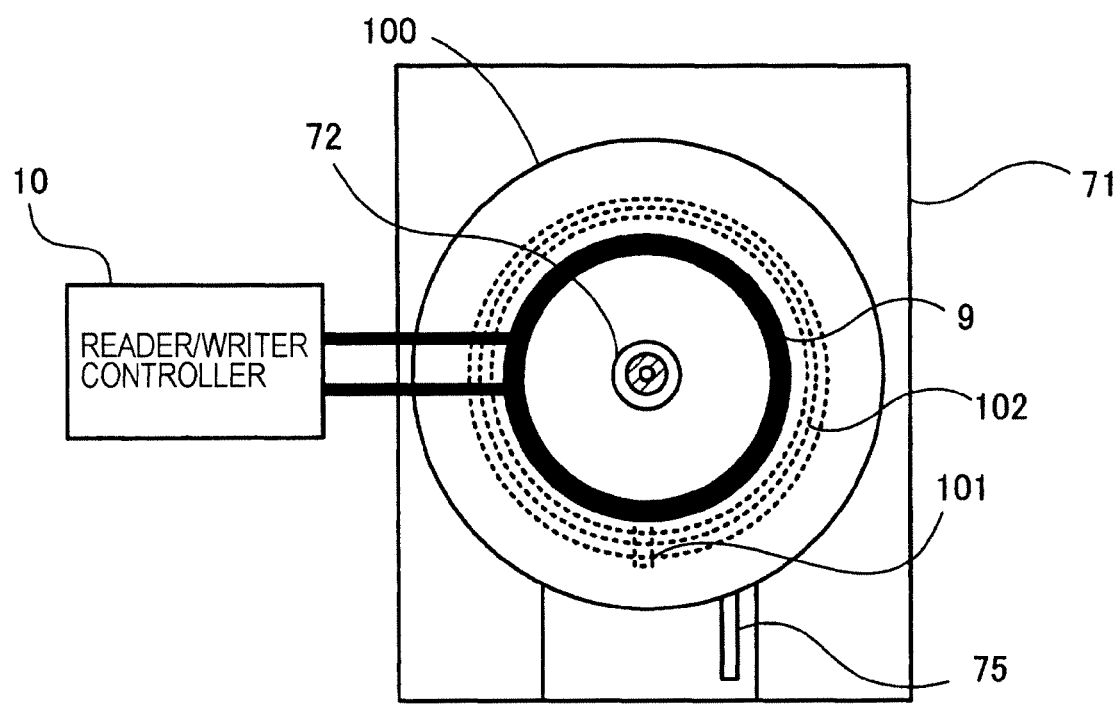
FIG. 4 is a diagram showing the structure of essential part of the optical disc recording and reproducing apparatus in which an optical disc is loaded.

FIG. 4 is a diagram showing the structure of essential part of the optical disc recording and reproducing apparatus 1 in which the optical disc 100 is loaded.

In the optical disc recording and reproducing apparatus 1, the center of the optical disc 100, the center of the spindle mechanism 72, and the center of the internal antenna 9 are approximately aligned with one another.

The optical disc 100 includes an IC chip 101 and a loop antenna coil 102 derived from the IC chip 101. The antenna coil 102 is arranged substantially concentrically with the internal antenna 9.

The IC chip 101 and the antenna coil 102 are arranged in inner part of the optical disc 100. The antenna coil 102 is made of one or more turns of wire wound concentrically or spirally. The IC chip 101 can store various pieces of information, e.g., information unique to the optical disc, information related to content recorded on the disc, copy protect information for the content, and/or information regarding the result of a game.

The optical disc 100 is not intended to be limiting. Examples of the optical disc include a Digital Versatile Disc (DVD, registered trademark), a Compact Disc (CD, registered trademark), and a Blu-ray disc (registered trademark).

Figure 5:
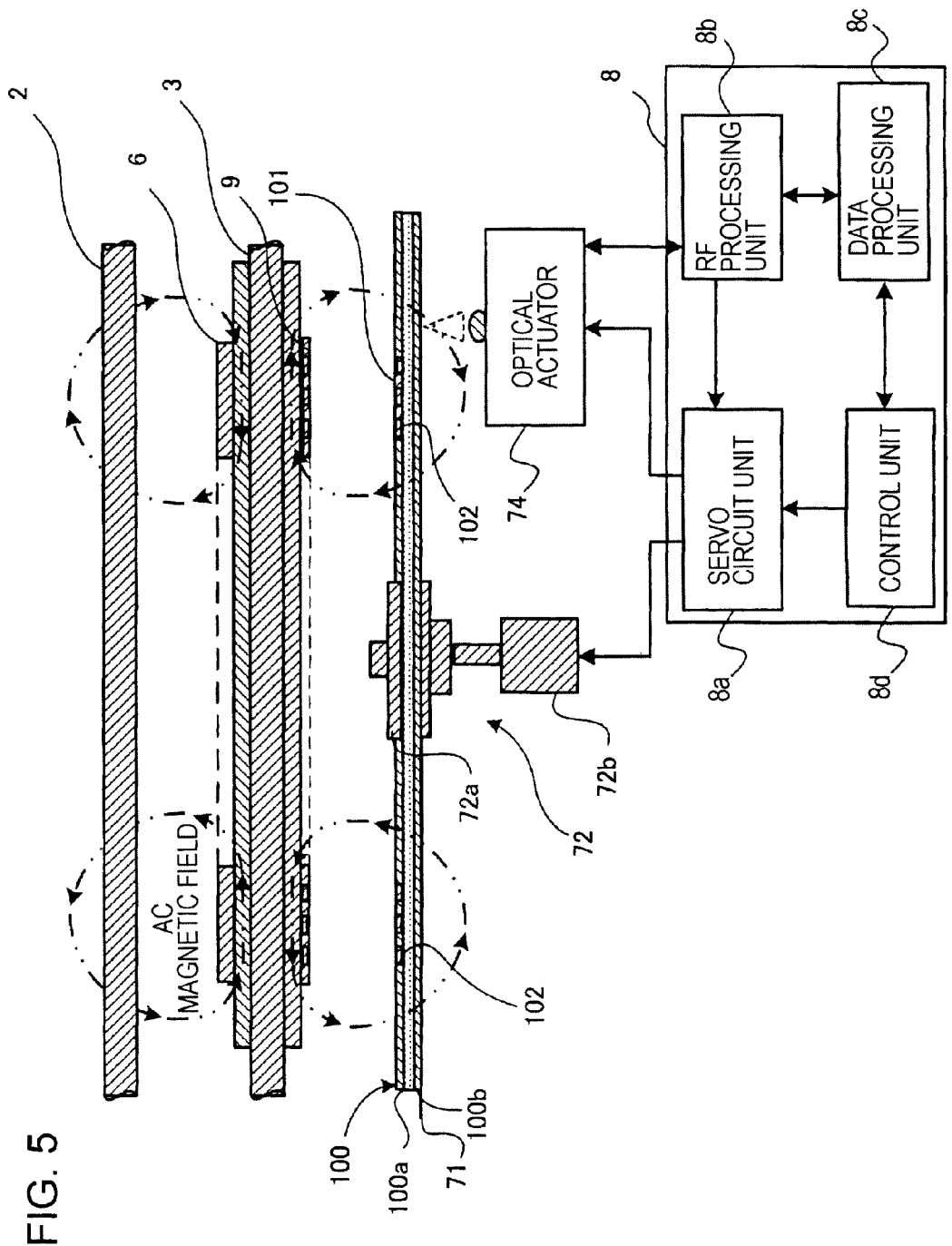
FIG. 5 shows a sectional side elevation of the optical disc recording and reproducing apparatus and processing blocks of the apparatus.

FIG. 5 shows a sectional side elevation of the optical disc recording and reproducing apparatus 1 and processing blocks of the apparatus.

The optical disc 100 includes a disc substrate 100*a* and a recording layer 100*b*, serving as a metal film formed on the disc substrate 100*a* by, for example, sputtering. The optical disc 100 is arranged on the disc tray 71 such that the recording layer 100*b* faces the optical pickup module 73 (included in the optical actuator 74 in FIG. 5).

The spindle mechanism 72 includes a chucking unit 72*a* for fixing the optical disc 100 and a spindle motor 72*b* for rotating the optical disc 100. The chucking unit 72*a* fixes the optical disc 100 using, for example, a magnet.

The optical actuator 74 includes the optical pickup module 73, a driving coil for focusing control, a coil for driving a tilt mechanism for skew servo control, a driving coil for tracking control, and a driving coil for thread control.

The drive circuit 8 is used for reproducing of information recorded on the optical disc 100 or recording of information on the optical disc 100.

The drive circuit 8 includes a servo circuit unit 8*a*, an RF processing unit 8*b*, a data processing unit 8*c*, and a control unit 8*d*.

The servo circuit unit 8*a* controls the spindle motor 72*b* and the optical actuator 74.

The RF processing unit 8*b* performs a process, e.g., waveform shaping, on an RF signal output from the optical pickup module 73 of the optical actuator 74, the RF signal being read from the optical disc 100. Further, the RF processing unit 8*b* supplies a write signal to be written to the optical disc 100 to the optical pickup module 73 of the optical actuator 74. In addition, the RF processing unit 8*b* feeds back detected focusing information and tracking information to the servo circuit unit 8*a*.

The data processing unit 8*c* processes a reproduced signal or a recording signal to be recorded.

The control unit 8*d* includes, for example, a central processing unit (CPU), transmits and receives data to/from the data processing unit 8*c*, and transmits a control signal to the servo circuit unit 8*a*.

The operation of the optical disc recording and reproducing apparatus 1 according to the present embodiment will now be described.

To read information from the optical disc 100, the servo circuit unit 8*a* drives the spindle motor 72*b* and the optical actuator 74 on the basis of a control signal supplied from the control unit 8*d*. Under the control of the servo circuit unit 8*a*, the optical pickup module 73 of the optical actuator 74 detects information recorded on the recording layer 100*b* as an RF signal and transmits the detected signal to the RF processing unit 8*b*. The RF processing unit 8*b* performs waveform shaping on the RF signal and also feeds back detected focusing information and tracking information to the servo circuit unit 8*a*. The servo circuit unit 8*a* controls the spindle motor 72*b* and the optical actuator 74 on the basis of the information and continues to read information on the basis of a control signal from the control unit 8*d*. The RF signal processed by the RF processing unit 8*b* is supplied to the data processing unit 8*c* and is processed as a reproduced signal.

On the other hand, to write information to the optical disc 100, the servo circuit unit 8*a* drives the spindle motor 72*b* and the optical actuator 74 on the basis of a control signal from the control unit 8*d* to record a recording signal supplied from the data processing unit 8*c* through the RF processing unit 8*b* in a predetermined position of the optical disc 100.

The reader/writer controller 10 supplies a predetermined current to the external antenna 6 in order to start communication with the IC chip 201 at predetermined timing, thus generating an AC magnetic field of a predetermined electric field strength. When the noncontact IC card 200 is close to the external antenna 6, the antenna coil 202 is inductively coupled to the external antenna 6. Consequently, communication between the IC chip 201 and the reader/writer controller 10 can be performed, so that information stored in the IC chip 201 can be read, alternatively, information can be written to the IC chip 201.

In addition, the reader/writer controller 10 supplies a predetermined current to the internal antenna 9 in order to start communication with the IC chip 101 at predetermined timing, thus generating an AC magnetic field of a predetermined electric field strength. Consequently, the antenna coil 102 of the optical disc 100 is inductively coupled to the internal antenna 9 on the opposite side of the optical disc 100 facing the optical pickup module 73 (optical actuator 74). Thus, communication between the IC chip 101 and the reader/writer controller 10 can be performed, so that information stored in the IC chip 101 can be read, alternatively, information can be written to the IC chip 101.

Figure 6:
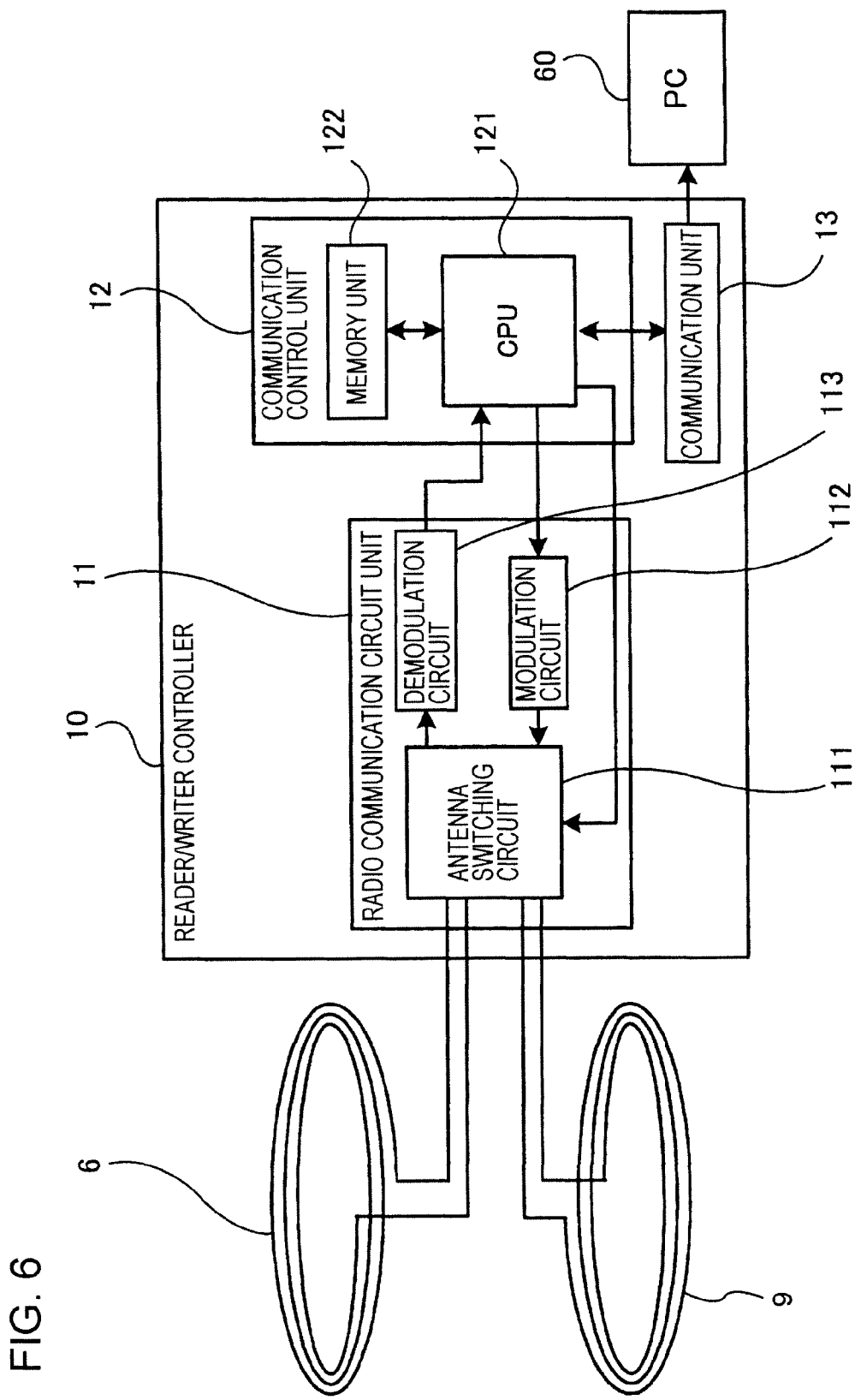
FIG. 6 is a block diagram showing the structure of a reader/writer controller.

FIG. 6 is a block diagram showing the structure of the reader/writer controller 10.

The reader/writer controller 10 includes a radio communication circuit unit 11 connected to the internal antenna 9 and the external antenna 6, a communication control unit 12, and a communication unit (interface) 13 connected to the communication control unit 12.

The radio communication circuit unit 11 includes an antenna switching circuit 111, a modulation circuit 112, and a demodulation circuit 113. The antenna switching circuit 111 switches between the internal antenna 9 and the external antenna 6 to be connected to the radio communication circuit unit 11 in accordance with an antenna control signal supplied from a CPU 121, which will be described later. The modulation circuit 112 modulates a signal supplied from the CPU 121 and outputs the modulated signal to the antenna switching circuit 111. The demodulation circuit 113 demodulates a signal received by the antenna switching circuit 111 and outputs the demodulated signal to the communication control unit 12.

The communication control unit 12 includes the CPU 121 and a memory unit 122.

The CPU 121 outputs an antenna control signal to the antenna switching circuit 111. Simultaneously, the CPU 121 performs an internal search operation using the internal antenna 9 to determine whether the optical disc 100 is loaded and performs an external search operation using the external antenna 6 to determine whether communication with the noncontact IC card 200 can be performed. At that time, the CPU 121 outputs a modulation signal to the modulation circuit 112 so that the amplitude of a signal supplied to the internal antenna 9 is made different from that of a signal supplied to the external antenna 6. In other words, the modulation signal controls the amplitude of a signal output of the modulation circuit 112.

Further, the CPU 121 processes a demodulated signal supplied from the demodulation circuit 113 during communication with the optical disc 100 or the noncontact IC card 200 and stores information obtained from the resultant signal to the memory unit 122 as necessary.

The CPU 121 outputs the resultant signal through the communication unit 13 to a personal computer (PC) 60, serving as an external electronic device disposed outside the optical disc recording and reproducing apparatus 1.

Figure 7:
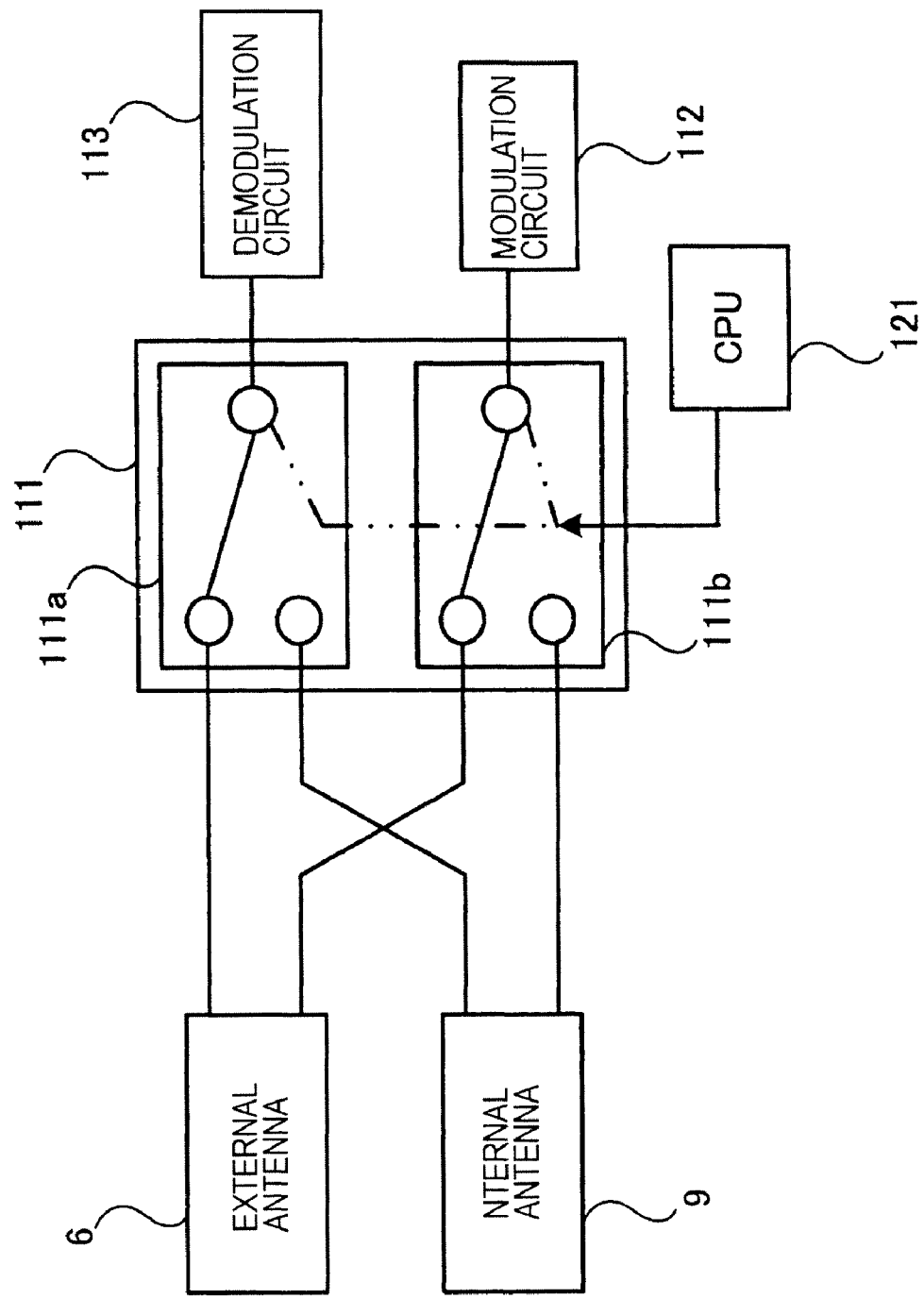
FIG. 7 is a circuit diagram of an antenna switching circuit.

FIG. 7 is a circuit diagram of the antenna switching circuit 111.

The antenna switching circuit 111 includes an antenna switching unit 111a and an antenna switching unit 111b. The antenna switching unit 111a outputs a control signal supplied from the modulation circuit 112 to the external antenna 6 or the internal antenna 9. The antenna switching unit 111b operates synchronously with the antenna switching unit 111a and outputs a control signal supplied from the modulation circuit 112 to the external antenna 6 or the internal antenna 9.

Each of the antenna switching units 111a and 111b is not particularly limited. For example, a mechanical antenna switching unit, such as a high frequency relay or a coaxial antenna switching unit, a semiconductor analog antenna switching unit, or a semiconductor multiplexer may be used.

Figure 8:
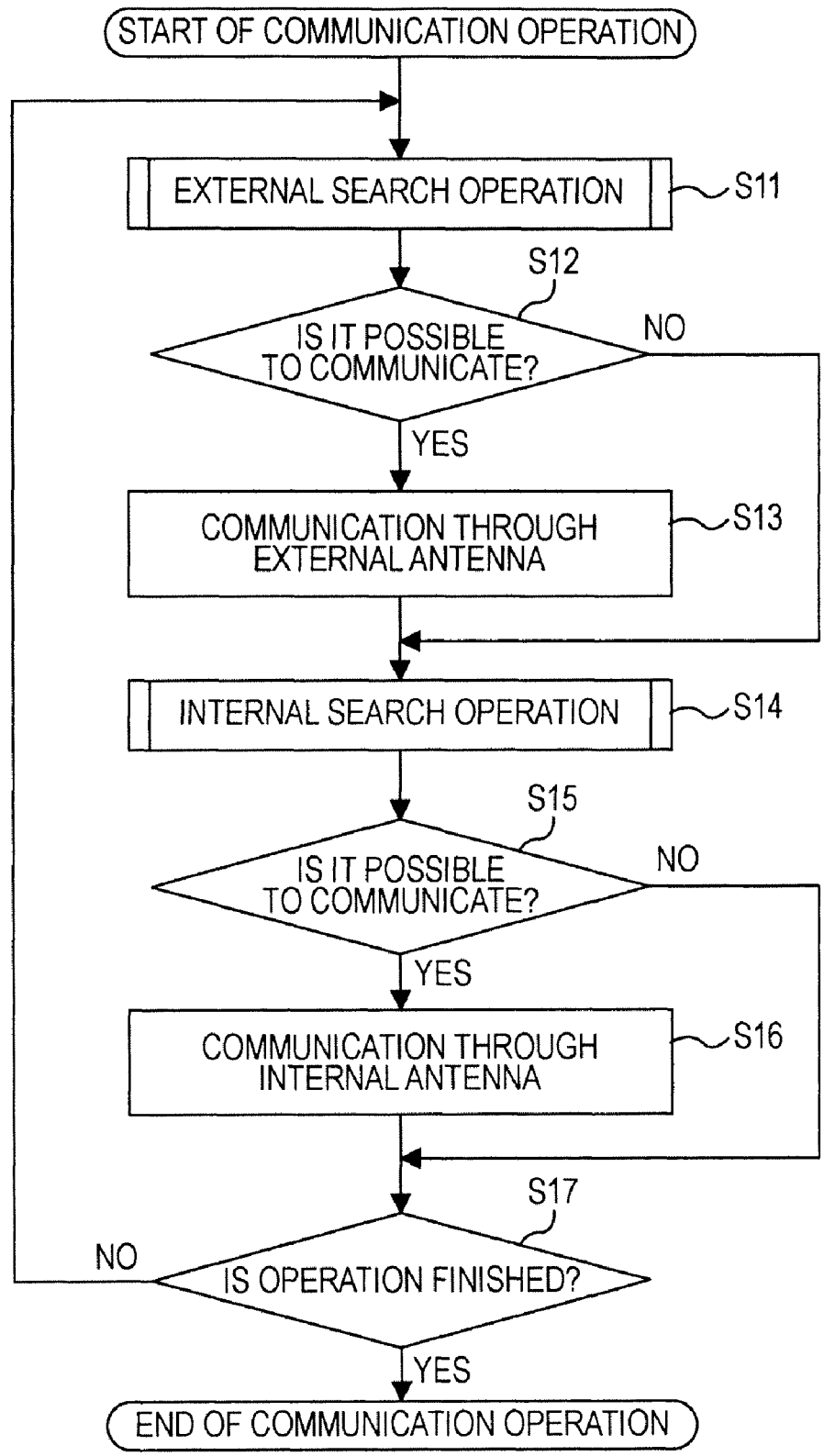
FIG. 8 is a flowchart illustrating a communication operation of the optical disc recording and reproducing apparatus.

FIG. 8 is a flowchart illustrating a communication operation of the optical disc recording and reproducing apparatus 1.

The CPU 121 performs the external search operation (step S11).

Subsequently, the CPU 121 determines whether it is possible to communicate with the noncontact IC card 200 (step S12).

If the external antenna 6 sends back a response signal (YES in step S12), communication processing is performed using the external antenna 6 (step S13) and the operation proceeds to step S14. If the external antenna 6 does not send a response signal (NO in step S12), the operation proceeds to step S14.

Subsequently, the CPU 121 performs the internal search operation (step S14).

The CPU 121 determines whether it is possible to communicate with the optical disc 100 (step S15).

If the external antenna 6 sends back a response signal (YES in step S15), communication processing is performed using the internal antenna 9 (step S16). The operation proceeds to step S17. If it is not possible to communicate with the optical disc 100 (NO in step S15), the operation proceeds to step S17.

Subsequently, the CPU 121 determines whether the communication operation is finished (step S17). If the communication operation is finished (YES in step S17), the communication operation is terminated. If the communication operation is not finished (NO in step S17), the operation is returned to step S11 and the following steps are repeated.

The external search operation of step S11 in FIG. 8 and the internal search operation of step S14 will now be described.

Figure 9:
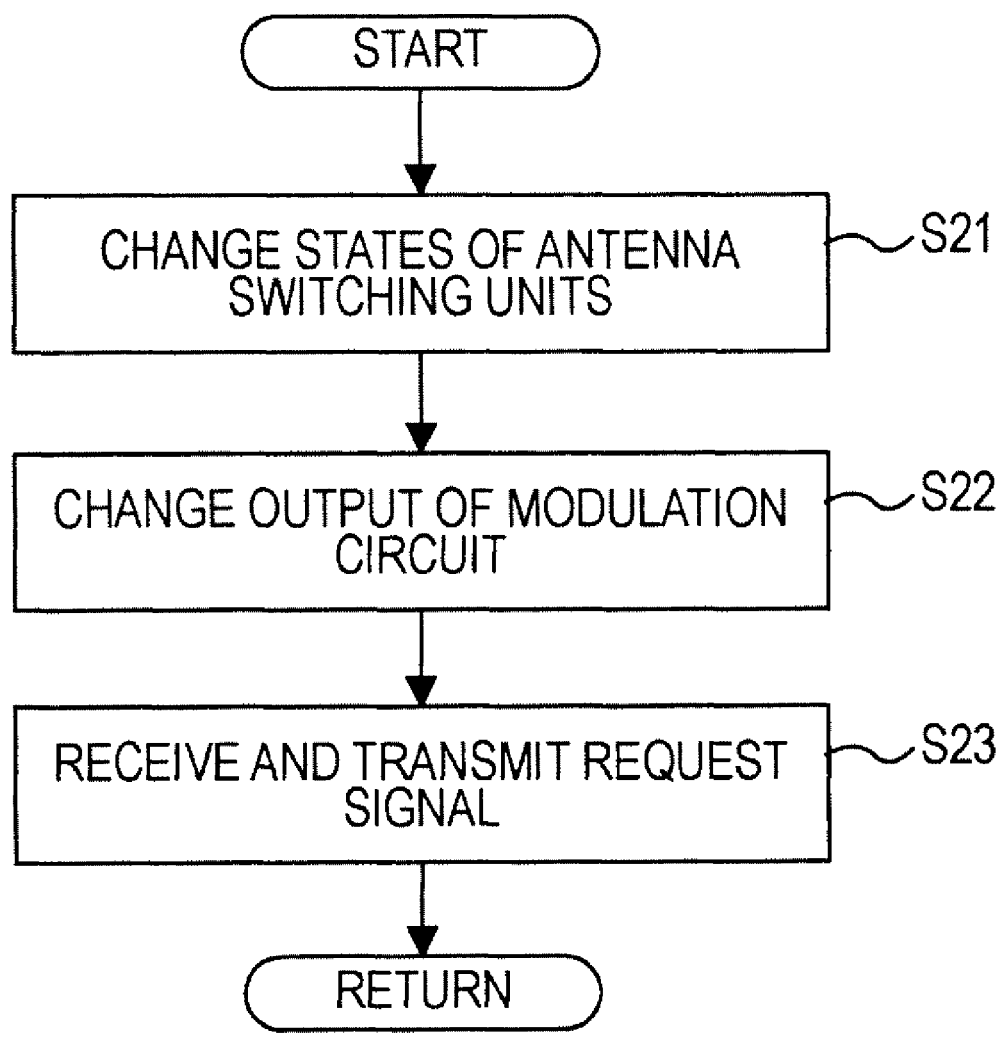
FIG. 9 is a flowchart of a search operation.

FIG. 9 is a flowchart showing the search operation.

When the search operation is the external search operation, the CPU 121 changes respective connection states of the antenna switching units 111a and 111b so that the units 111a and 111b are connected to the external antenna 6. When the search operation is the internal search operation, the CPU 121 changes the respective connection states of the antenna switching units 111a and 111b so that the units 111a and 111b are connected to the internal antenna 9 (step S21). The CPU 121 then changes an output of the modulation circuit 112 (step S22). After that, the CPU 121 receives and transmits a request signal for communication start (step S23). After that, the operation is returned to the main routine.

Figure 10:
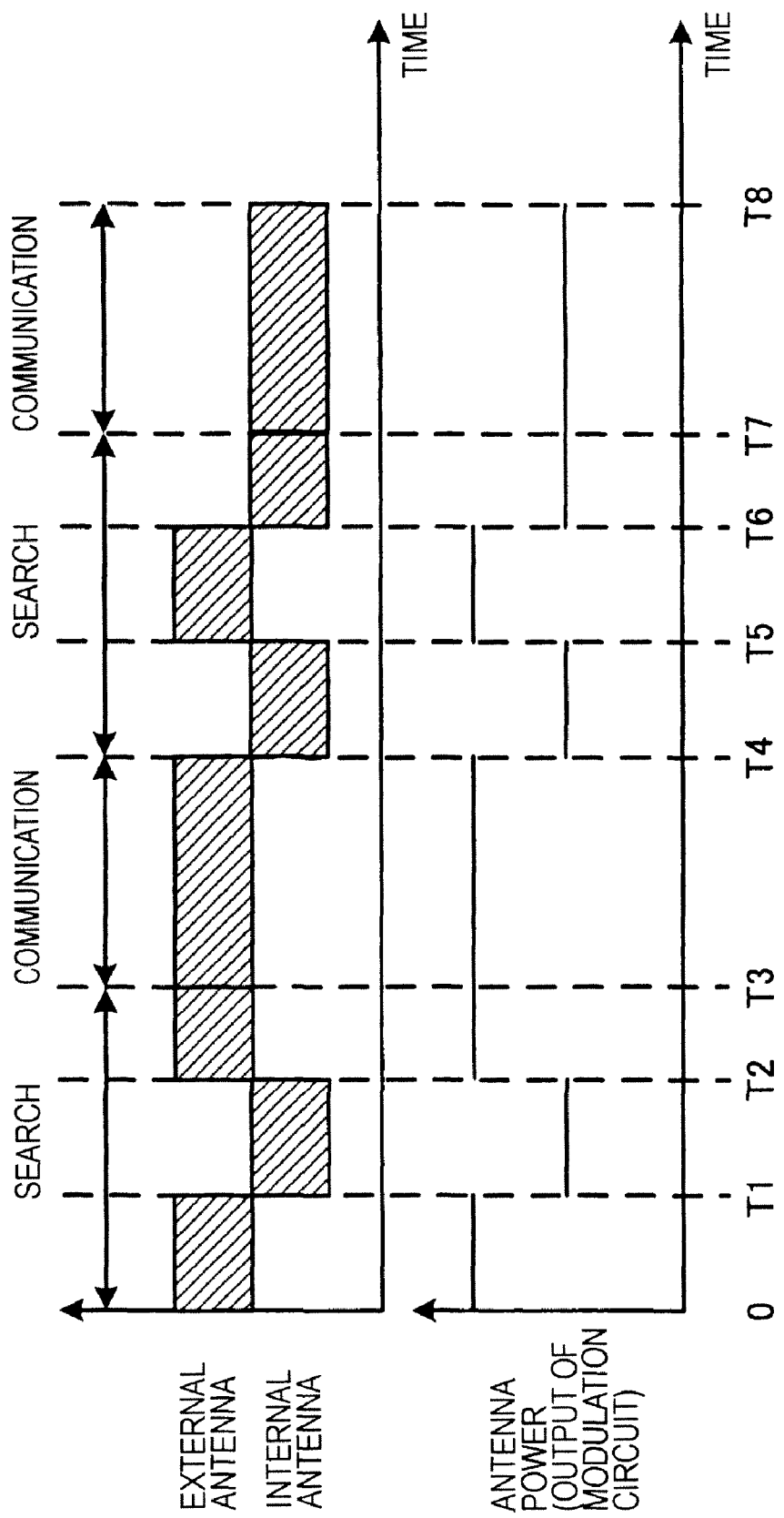
FIG. 10 is a timing chart showing an example of timing for changing states of antenna switching units.

FIG. 10 is a timing chart showing an example of timing for changing the respective states of the antenna switching units 111a and 111b.

Referring to FIG. 10, each period of time during which the AC magnetic field is generated from the internal antenna 9 or the external antenna 6 is shown by a hatched portion.

The AC magnetic field strength output from each antenna is shown as antenna power.

As described above, the CPU 121 makes the amplitude of a signal supplied to the internal antenna 9 different from that of a signal supplied to the external antenna 6 so that the AC magnetic field generated by the external antenna 6 is larger than that generated by the internal antenna 9.

Referring to FIG. 10, the CPU 121 repeats the external search operation (time period from 0 to T1, time period from T2) and the internal search operation (time period from T1 to T2). Since the external antenna 6 sends a response signal at time T3 during the external search operation, communication processing is performed using the external antenna 6. When the communication processing is finished at time T4, the CPU 121 repeats the internal search operation (time period from T4 to T5, time period from T6) and the external search operation (time period from T5 to T6). Since the internal antenna 9 sends a response signal at time T7 during the internal search operation, communication processing is performed through the internal antenna 9. When the communication processing is finished at time T8, the communication operation is terminated.

A concrete example of the communication operation of the optical disc recording and reproducing apparatus 1 will now be described.

Figure 11:
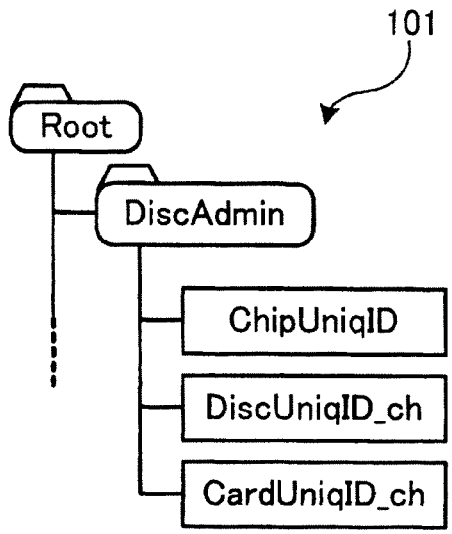
FIG. 11 is a schematic diagram showing data stored in an IC chip in the optical disc.

FIG. 11 is a diagram schematically showing data stored in the IC chip 101 of the optical disc 100.

The IC chip 101 stores data in a hierarchical structure.

Referring to FIG. 11, a folder "Root" in the IC chip 101 includes a folder "DiscAdmin". The folder "DiscAdmin" contains data "ChipUniqID_di" representing the unique ID of the IC chip 101, data "DiscUniqID_di" representing the unique ID of the recording layer 100b in the IC chip 101, and data "CardUniqID_di" representing the unique ID of the noncontact IC card 200 in the IC chip 101.

Figure 12:
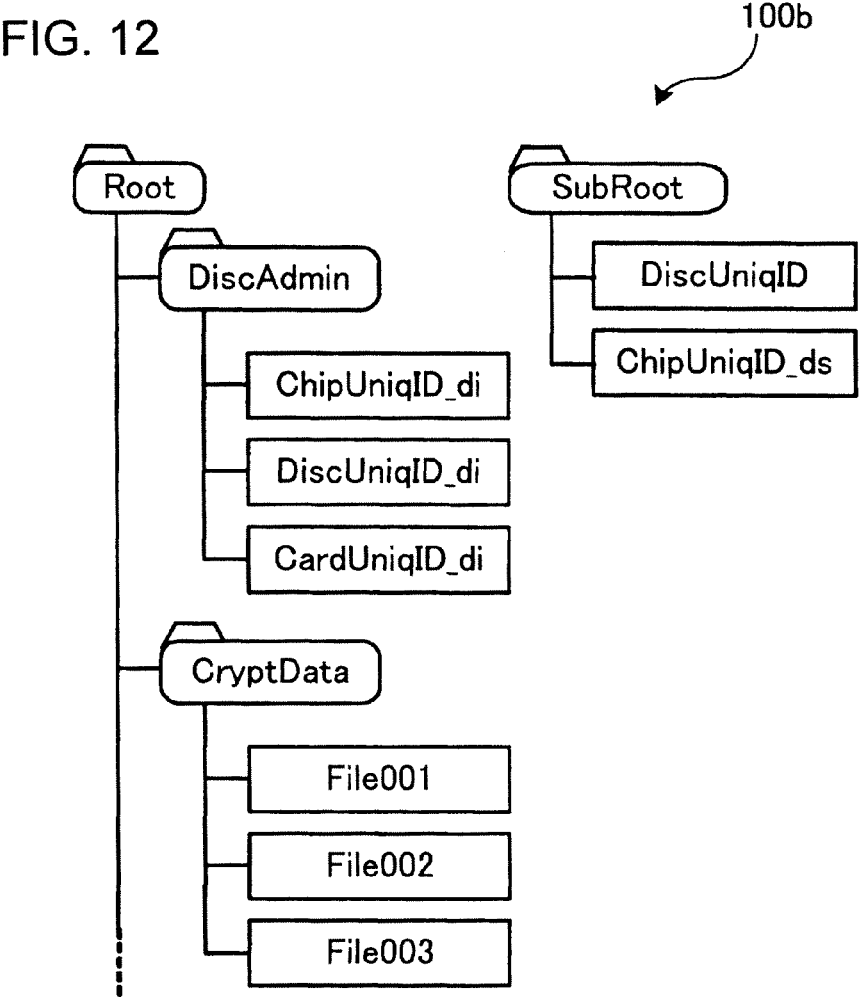
FIG. 12 is a schematic diagram showing data stored in a recording layer of the optical disc.

FIG. 12 is a diagram schematically showing data stored in the recording layer 100b of the optical disc 100.

The recording layer 100b stores a folder "Root" and a folder "SubRoot". In each folder, data is stored in a hierarchical structure.

The folder "Root" in the recording layer 100b contains primary data based on a signal pit pattern. The folder "SubRoot" contains secondary data based on a BCA signal and a watermark signal.

Referring to FIG. 12, the folder "Root" in the recording layer 100b has a folder "DiscAdmin" and a folder "CryptData". The folder "DiscAdmin" contains data "ChipUniqID_di" representing the unique ID of the IC chip 101 in the recording layer 100b, data "DiscUniqID_di" representing the unique ID of the recording layer 100b, and data "CardUniqID_di" representing the unique ID of the noncontact IC card 200 in the recording layer 100b.

The folder "CryptData" includes files "File001", "File002", and "File003" representing strings of data recorded as primary data in the optical disc 100. The files "File001", "File002", and "File003" are encrypted using an encryption key (not shown).

The files "File001", "File002", and "File003" are not particularly limited. For example, a file on a file system defined by the Universal Disk Format (UDF, Japanese Standard Association, TR X 0035:2000), the ISO-9660 format, the Joliet format serving as an extended version of the ISO-9660 format, or the BD-FS format may be used.

The folder "SubRoot" contains non-rewritable data sets "DiscUniqID" and "ChipUniqID_ds". It is preferred that the data "DiscUniqID" be recorded by a method of writing data so that the data is not easily tampered. The security of copyright protection can be further improved.

Figure 13:
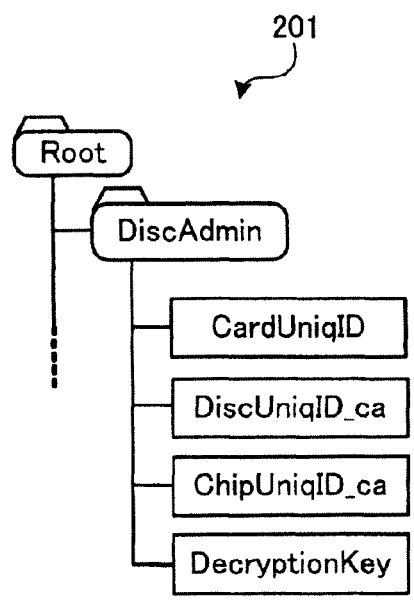
FIG. 13 is a schematic diagram showing data stored in an IC chip in the noncontact IC card.

FIG. 13 is a diagram schematically showing data stored in the IC chip 201 of the noncontact IC card 200.

The IC chip 201 stores data in a hierarchical structure.

Referring to FIG. 13, a folder "Root" includes a folder "DiscAdmin". The folder "DiscAdmin" contains data "ChipUniqID" representing the unique ID of the IC chip 101 in the IC chip 201, data "DiscUniqID_ca" representing the unique ID of the recording layer 100b in the IC chip 201, and data "CardUniqID_ca" representing the unique ID of the IC chip 201, and data "DecryptionKey", serving as a decryption key used for decrypting a file encrypted using an encryption key "EncryptionKey".

When the optical disc 100 is loaded into the optical disc recording and reproducing apparatus 1 and recording or reproducing is started, the reader/writer controller 10 recognizes that it is possible to communicate using the internal antenna 9. Whether it is possible to communicate can be recognized by polling communication. Specifically, in the use of commands and a protocol specified in ISO 14443-3 (JIS X6322-3), the CPU 121 (PCD) confirms that communication with the IC chip 101 (PICC) in the optical disc 100 can be started, i.e., the reader/writer controller 10 receives a select acknowledge (SAK) signal indicating that UID is complete.

Communication processing between the IC chip 101 and the reader/writer controller 10 will now be described in detail.

The CPU 121 reads the data "ChipUniqID" from the IC chip 101 and stores the data in the memory unit 122. If necessary, the CPU 121 simultaneously reads either or both of the data "DiscUniqID_ch" and the data "CardUniquID_ch" and stores the read data in the memory unit 122.

Simultaneously with reading the data in the IC chip 101 of the loaded optical disc 100, the CPU 121 reads data recorded in the recording layer 100b. In this operation, the CPU 121 reads the data "DiscUniqID" in the folder "SubRoot" and stores the data in the memory unit 122.

If necessary, the CPU 121 reads the data "ChipUniqID_ds" in the folder "SubRoot". Further, the CPU 121 reads the data sets "DiscUniqID_di", "ChipUniqID_di", and "CardUniqID_di" from the recording layer 100b and stores the data sets in the memory unit 122.

In this instance, the CPU 121 compares the data "DiscUniqID" recorded in the recording layer 100b, the data "DiscUniqID_di" recorded in the recording layer 100b, and the data "DiscUniqID_ch" recorded in the IC chip 101. When the data sets agree, the CPU 121 can confirm that the optical disc 100 is not counterfeit, i.e., it is authentic.

Further, the CPU 121 compares the data "ChipUniqID" recorded in the IC chip 101, the data "ChipUniqID_di" recorded in the recording layer 100b, and the data "ChipUniqID_ds" recorded in the recording layer 100b. When the data sets agree, the CPU 121 can confirm that the optical disc 100 is not counterfeit, i.e., it is authentic.

In accordance with the above-described procedure, whether the optical disc 100 loaded in the optical disc recording and reproducing apparatus 1 is authenticated can be confirmed. Since the files "File001" and "File002" are encrypted, it is detected that data in those files is not reproduced as it is.

The CPU 121, therefore, displays a message "Hold a noncontact IC card containing a decryption key over the card presentation portion" on, for example, a monitor (not shown) in the optical disc recording and reproducing apparatus 1 to prompt a user to hold the noncontact IC card 200 over the card presentation portion 21 so that the optical disc recording and reproducing apparatus 1 receives the decryption key.

When the user holds the noncontact IC card 200 over the card presentation portion 21 and the noncontact IC card 200 reaches the vicinity of the external antenna 6, the optical disc recording and reproducing apparatus 1 performs the following communication operation using the external antenna 6 to receive the decryption key.

When the noncontact IC card 200 is held over the card presentation portion 21, the CPU 121 recognizes that it is possible to communicate with the noncontact IC card 200 through the external antenna 6. The operation of recognizing whether it is possible to communicate can be performed by the above-described polling communication.

The IC chip 201 (PICC) and the CPU 121 (PCD) perform the following communication processing.

The CPU 121 reads the data "DecryptionKey" stored in the IC chip 201 of the noncontact IC card 200 and stores the data in the memory unit 122. If necessary, the CPU 121 simultaneously reads the data sets "CardUniqID", "DiscUniqID_ca", and "ChipUniqID_ca" and stores the data sets in the memory unit 122.

As examples of communication protocols for reading data, such as unique ID, a frame format, commands, and a protocol specified in ISO 14443-3 (JIS X6322-3) and commands and a protocol specified in ISO 14443-4 (JIS X6322-4) may be used. An activation procedure is executed using those protocols, so that data communication based on a half-duplex block transmission protocol can be performed.

Consequently, the files "File001" and "File002" in the recording layer 100b can be decrypted using the decryption key "DecryptionKey", so that data in those files can be reproduced.

In this instance, the CPU 121 compares the data sets "CardUniqID", "CardUniqID_di", and "CardUniqID_ch" stored in the memory unit 122 in order to verify the decryption key "DecryptionKey". When the data sets agree, the CPU 121 can confirm that the noncontact IC card 200 is not counterfeit, i.e., it is authentic. Furthermore, the CPU 121 compares the data "DiscUniqID" recorded in the recording layer 100b with the data "DiscUniqID_ca", alternatively, the CPU 121 compares the data sets "ChipUniqID" and "ChipUniqID_ca". When the data sets agree, the CPU 121 can confirm that the noncontact IC card 200 is not counterfeit, i.e., it is authentic.

As described above, a first unique ID recorded in the recording layer 100b can be checked against a second unique ID recorded in the IC chip 101 to verify the optical disc 100 and, after that, reproduced data can be provided to the user. In addition, the decryption key is read from the noncontact IC card 200 held over the card presentation portion 21 and the reproduced data is decrypted using the decryption key read from the noncontact IC card 200, so that the reproduced data that is encrypted can be decrypted and be then provided to the user.

The combination of the noncontact IC card 200 and the optical disc 100 can increase the security of information recorded on the optical disc 100 and simultaneously authenticate the optical disc 100.

As described above, in the optical disc recording and reproducing apparatus 1, the one reader/writer controller 10 (CPU 121) can easily and reliably determine whether the apparatus is communicating with the IC chip 101 in the optical disc 100 or the IC chip 201 in the noncontact IC card 200. Consequently, the optical disc recording and reproducing apparatus 1 can be simplified in structure and be reduced in cost.

Particularly, when the reader/writer controller 10 controls the communication with the IC chip 101 and that with the IC chip 201 such that the communication is associated with the other one, the unique IDs included in the IC chip 101 can be easily checked against those in the IC chip 201. Consequently, during reproducing of data recorded on the optical disc 100 or recording of data on the optical disc 100, copyright protection information sets recorded in the IC chip 101 and the IC chip 201 are read while the unique IDs recorded in the recording layer 100b are read, and the read information sets are compared with the read IDs, thus improving the security of copyright protection.

Since the internal antenna 9 and the external antenna 6 are disposed on opposite sides of the casing 3, interference between electromagnetic waves from those antennas may be prevented.

Standards for communication between the optical disc recording and reproducing apparatus 1 and the optical disc 100 and that between the optical disc recording and reproducing apparatus 1 and the noncontact IC card 200 are not particularly limited. For example, ISO 14443 (Type A), e.g., Mifare (registered trademark) standard may be used.

An optical disc recording and reproducing apparatus according to a second embodiment of the present invention will be described.

The difference between the optical disc recording and reproducing apparatus according to the second embodiment and that according to the first embodiment will be mainly described. A description of matters similar to those of the first embodiment is omitted.

The optical disc recording and reproducing apparatus according to the second embodiment differs from that according to the first embodiment in the structure of an antenna switching circuit. The other structure of the apparatus according to the second embodiment is similar to that according to the first embodiment.

Figure 14:
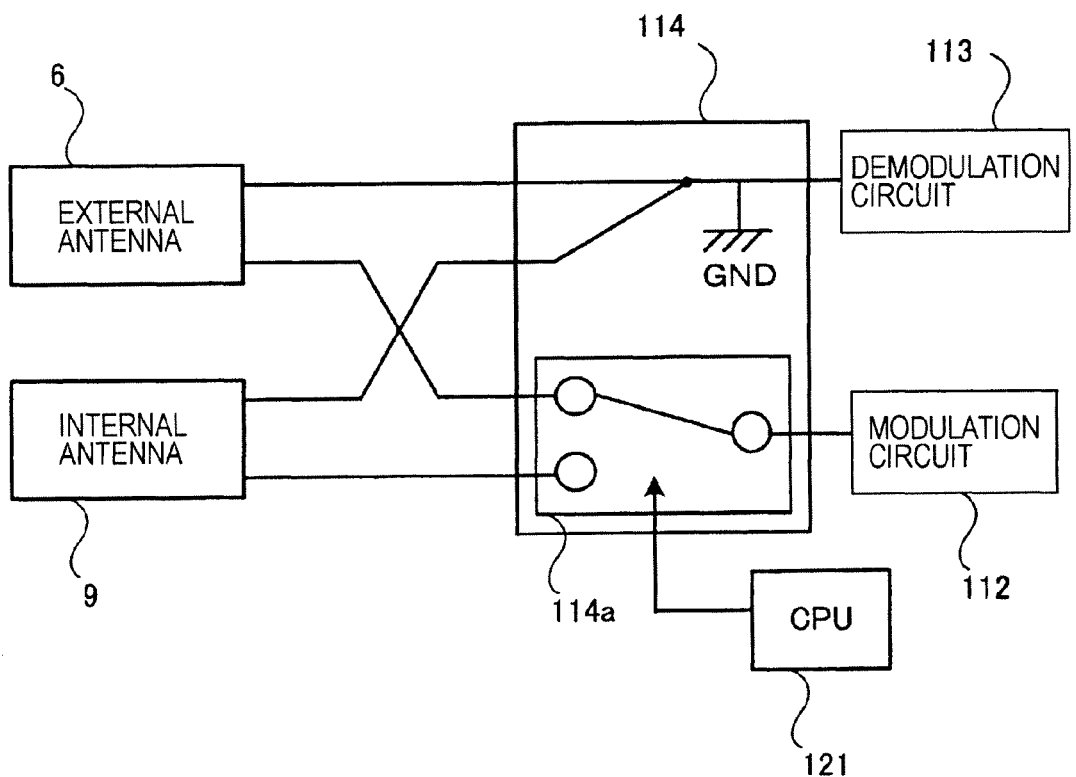
FIG. 14 is a circuit diagram of an antenna switching circuit according to a second embodiment of the present invention.

FIG. 14 is a circuit diagram of an antenna switching circuit 114 according to the second embodiment.

The antenna switching circuit 114 according to the second embodiment has an antenna switching unit 114a controlled by a CPU 121.

One terminal of an internal antenna 9 and that of an external antenna 6 are connected to the antenna switching unit 114a. The other terminal of the internal antenna 9 and that of the external antenna 6 are connected to ground (GND).

The CPU 121 changes a state of the antenna switching unit 114a to another state, thus switching between the external antenna 6 and the internal antenna 9 to be connected to a modulation circuit 112.

The optical disc recording and reproducing apparatus according to the second embodiment has the same advantages as those of the optical disc recording and reproducing apparatus 1 according to the first embodiment.

An optical disc recording and reproducing apparatus according to a third embodiment of the present invention will now be described.

The difference between the optical disc recording and reproducing apparatus according to the third embodiment and that according to the first embodiment will be mainly described. A description of matters similar to those of the first embodiment is omitted.

The optical disc recording and reproducing apparatus according to the third embodiment differs from that according to the first embodiment in the structure of an antenna switching circuit and a search operation. The apparatus according to the third embodiment is similar to that according to the first embodiment except for the above-described difference.

Figure 15:
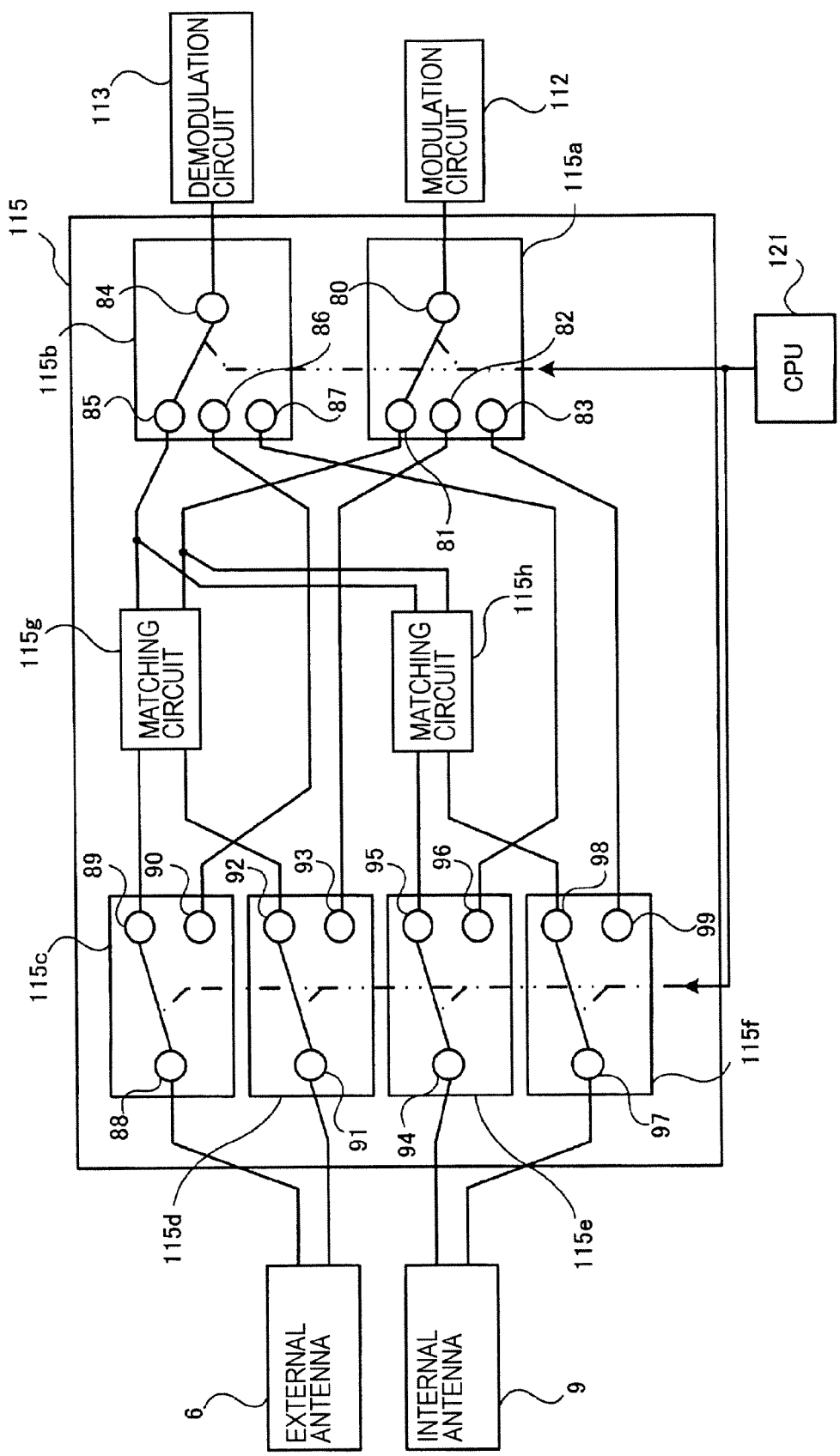
FIG. 15 is a circuit diagram of an antenna switching circuit according to a third embodiment of the present invention.

FIG. 15 is a circuit diagram of an antenna switching circuit 115 according to the third embodiment.

The antenna switching circuit 115 according to the third embodiment has antenna switching units 115a to 115f controlled by a CPU 121 and matching circuits 115g and 115h for impedance matching.

The antenna switching unit 115a includes terminals 80 to 83. The terminal 80 is connected to a modulation circuit 112. The terminal 81 is connected to the antenna switching unit 115d through the matching circuit 115g and is connected to the antenna switching unit 115f through the matching circuit 115*h*. The terminal 82 is connected to the antenna switching unit 115*d* not through the matching circuit 115*g*. The terminal 83 is connected to the antenna switching unit 115*f*.

The antenna switching unit 115*b* includes terminals 84 to 87. The terminal 84 is connected to a demodulation circuit 113. The terminal 85 is connected to the antenna switching unit 115*c* through the matching circuit 115*g* and is connected to the antenna switching unit 115*e* through the matching circuit 115*h*. The terminal 86 is connected to the antenna switching unit 115*c* not through the matching circuit 115*g*. The terminal 87 is connected to the antenna switching unit 115*e*.

The antenna switching unit 115*c* includes terminals 88 to 90. The terminal 88 is connected to an external antenna 6. The terminal 89 is connected to the antenna switching unit 115*b* through the matching circuit 115*g*. The terminal 90 is connected to the antenna switching unit 115*b* not through the matching circuit 115*g*.

The antenna switching unit 115*d* includes terminals 91 to 93. The terminal 91 is connected to the external antenna 6. The terminal 92 is connected to the antenna switching unit 115*a* through the matching circuit 115*g*. The terminal 93 is connected to the antenna switching unit 115*a* not through the matching circuit 115*g*.

The antenna switching unit 115*e* includes terminals 94 to 96. The terminal 94 is connected to an internal antenna 9. The terminal 95 is connected to the antenna switching unit 115*b* through the matching circuit 115*h*. The terminal 96 is connected to the antenna switching unit 115*b* not through the matching circuit 115*h*.

The antenna switching unit 115*f* includes terminals 97 to 99. The terminal 97 is connected to the internal antenna 9. The terminal 98 is connected to the antenna switching unit 115*a* through the matching circuit 115*h*. The terminal 99 is connected to the antenna switching unit 115*a* not through the matching circuit 115*h*.

According to the third embodiment, the optical disc recording and reproducing apparatus has three modes, i.e., a simultaneous search operation mode, an external search operation mode, and an internal search operation mode. In the simultaneous search operation mode, an output of the modulation circuit 112 is output to each of the external antenna 6 and the internal antenna 9 through the matching circuits 115*g* and 115*h*, respectively, during search. In the external search operation mode, the output of the modulation circuit 112 is output to the external antenna 6 not through the matching circuits 115*g* and 115*h* during search. In the internal search operation mode, the output of the modulation circuit 112 is output to the internal antenna 9 not through the matching circuits 115*g* and 115*h* during search.

In the simultaneous search operation mode, the CPU 121 performs a simultaneous search operation. Specifically, the terminals 80 and 81 are connected in the antenna switching unit 115*a*, the terminals 84 and 85 are connected in the antenna switching unit 115*b*, the terminals 88 and 89 are connected in the antenna switching unit 115*c*, the terminals 91 and 92 are connected in the antenna switching unit 115*d*, the terminals 94 and 95 are connected in the antenna switching unit 115*e*, and the terminals 97 and 98 are connected in the antenna switching unit 115*f*. Consequently, the output of the modulation circuit 112 is supplied to the external antenna 6 through the antenna switching unit 115*a*, the matching circuit 115*g*, and the antenna switching unit 115*d*. Simultaneously, the output of the modulation circuit 112 is supplied to the internal antenna 9 through the matching circuit 115*h* and the antenna switching unit 115*f*. In the simultaneous search operation mode, the magnitude of power output from the external antenna 6 and that from the internal antenna 9 are equivalent to that from the external antenna 6 in the first embodiment.

When the internal antenna 9 sends back a response signal, the signal is supplied to the demodulation circuit 113 through the antenna switching unit 115*e*, the matching circuit 115*h*, and the antenna switching unit 115*b*.

When the external antenna 6 sends back a response signal, the signal is supplied to the demodulation circuit 113 through the antenna switching unit 115*c*, the matching circuit 115*g*, and the antenna switching unit 115*b*.

In the external search operation mode, the CPU 121 performs an external search operation. Specifically, the terminals 80 and 82 are connected in the antenna switching unit 115*a*, the terminals 84 and 86 are connected in the antenna switching unit 115*b*, the terminals 88 and 90 are connected in the antenna switching unit 115*c*, and the terminals 91 and 93 are connected in the antenna switching unit 115*d*. The terminal connection state of each of the antenna switching units 115*e* and 115*f* is not limited. It is preferred that the terminals be grounded.

Consequently, the output of the modulation circuit 112 is supplied to the external antenna 6 through the antenna switching units 115*a* and 115*d*.

When the external antenna 6 sends back a response signal, the signal is supplied to the demodulation circuit 113 through the antenna switching units 115*c* and 115*b*.

In the internal search operation mode, the CPU 121 performs an internal search operation. Specifically, the terminals 80 and 83 are connected in the antenna switching unit 115*a*, the terminals 84 and 87 are connected in the antenna switching unit 115*b*, the terminals 94 and 95 are connected in the antenna switching unit 115*e*, and the terminals 97 and 98 are connected in the antenna switching unit 115*f*. The terminal connection state of each of the antenna switching units 115*c* and 115*d* is not restricted. It is preferred that the terminals be grounded.

Consequently, the output of the modulation circuit 112 is supplied to the internal antenna 9 through the antenna switching units 115*a* and 115*f*.

When the internal antenna 9 sends back a response signal, the signal is supplied to the demodulation circuit 113 through the antenna switching units 115*e* and 115*b*.

The search operation according to the third embodiment will now be described.

Figure 16:
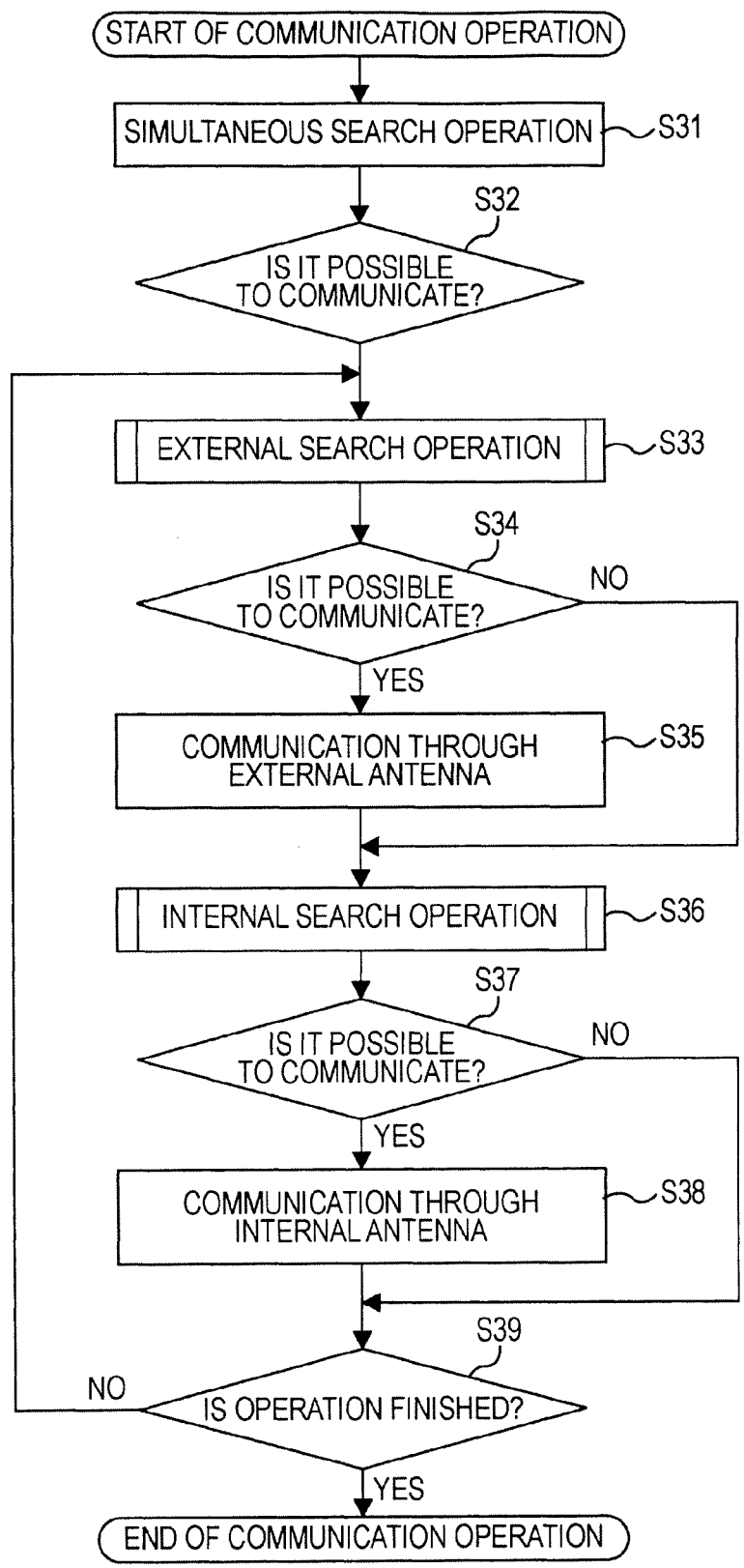
FIG. 16 is a flowchart of a search operation according to the third embodiment.

FIG. 16 is a flowchart illustrating the search operation according to the third embodiment.

The CPU 121 performs the above-described simultaneous search operation (step S31).

The CPU 121 determines whether it is possible to communicate with either or both of a noncontact IC card 200 and an optical disc 100 (step S32).

If it is possible to communicate, step S33 and subsequent steps are executed to perform the external search operation and the internal search operation in accordance with the present embodiment. Since steps S33 to S39 are the same as steps S11 to S17 according to the first embodiment, a description thereof is omitted.

Figure 17:
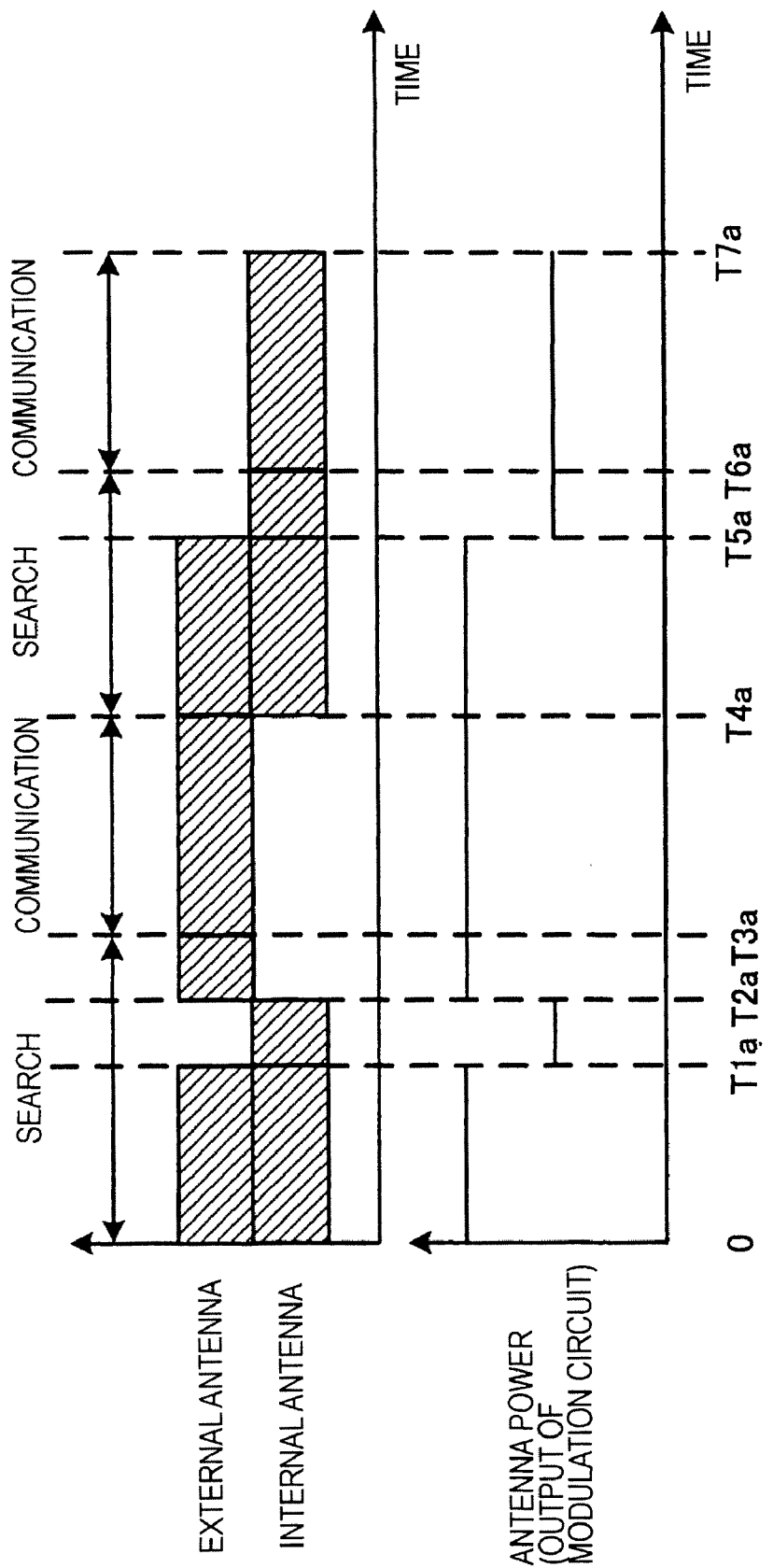
FIG. 17 is a timing chart showing an example of timing for changing states of antenna switching units.

FIG. 17 is a timing chart showing an example of timing for changing the connection states of the antenna switching units.

Referring to FIG. 17, the simultaneous search operation is initially performed. Since the internal antenna 9 or the external antenna 6 sends a response signal at time T1*a*, the internal search operation is performed (for a period from time T1*a* to time T2*a*). At that time, the antenna power is reduced. Since any response signal is not sent from the internal antenna 9, the antenna power is increased and the external search operation is performed (for a period from time T2a to time T3a). After that, communication processing is performed (for a period from time T3a to time T4a). After the communication processing terminates, the simultaneous search operation is again performed (for a period from time T4a to time T5a). Since a response signal is sent from the internal antenna 9 or the external antenna 6 at time T5a, the antenna power is reduced and the internal search operation is performed (for a period from time T5a to time T6a). Since a response signal is sent from the internal antenna 9 at time T6a, communication processing is performed (for a period from time T6a to time T7a). After the communication processing terminates at time T7a, the communication operation is finished.

The optical disc recording and reproducing apparatus according to the third embodiment has the same advantages as those according to the first embodiment.

An optical disc recording and reproducing apparatus according to a fourth embodiment of the present invention will now be described.

The difference between the optical disc recording and reproducing apparatus according to the fourth embodiment and that according to the foregoing first embodiment will be mainly described. A description of matters similar to those of the first embodiment is omitted.

Figure 18A:
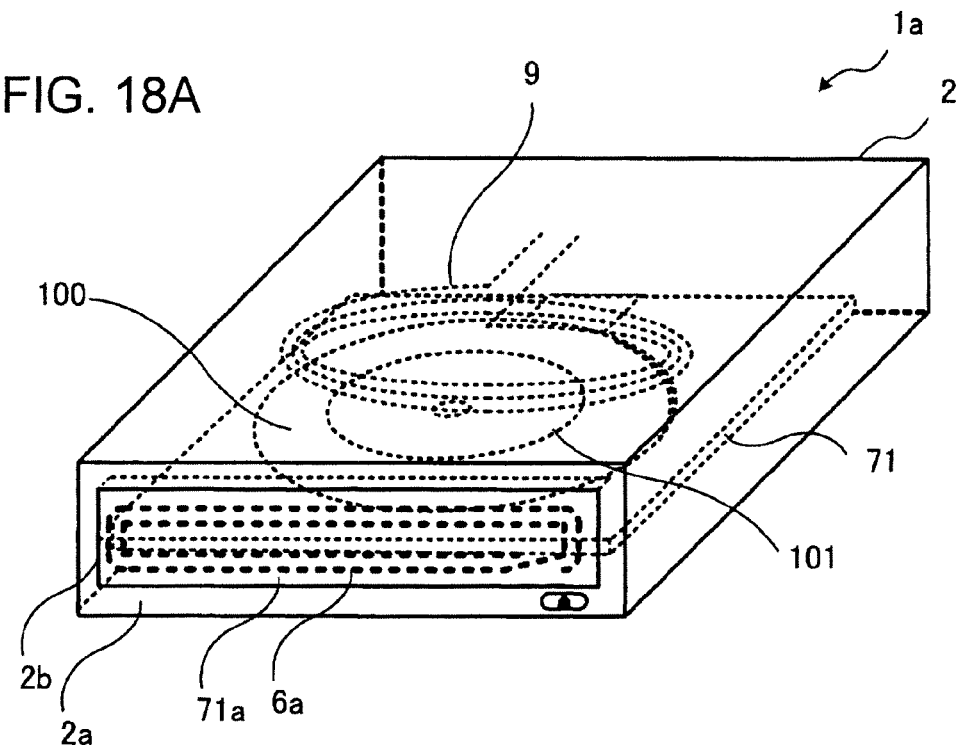
FIG. 18A is a perspective view of an optical disc recording and reproducing apparatus according to a fourth embodiment of the present invention.
Figure 18B:
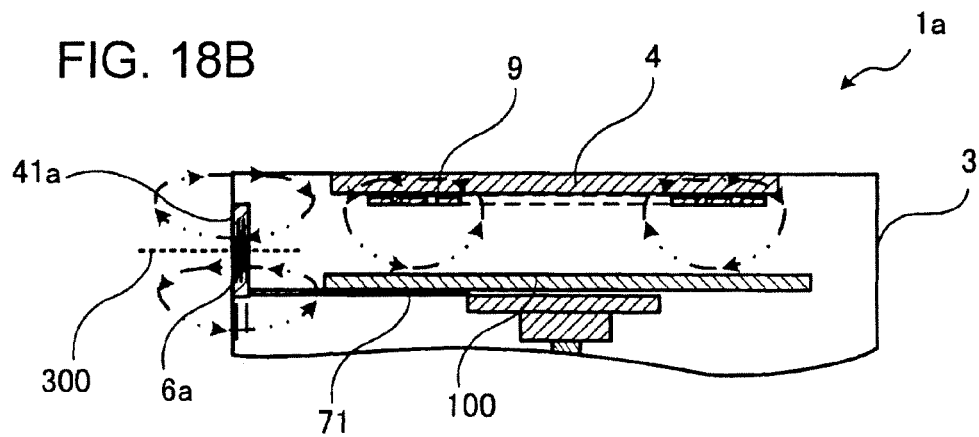
FIG. 18B is a side view of the optical disc recording and reproducing apparatus according to the fourth embodiment.

FIG. 18A is a perspective view of an optical disc recording and reproducing apparatus 1a according to the fourth embodiment. FIG. 18B is a sectional side elevation view thereof. In FIGS. 18A and 18B, an external antenna 6a is exaggerated.

The optical disc recording and reproducing apparatus 1a according to the fourth embodiment has the same structure as that according to the first embodiment except for the arrangement of the external antenna 6a.

Referring to FIG. 18A, a front surface 2a of a chassis 2 has a slot 2b, through which a disc tray 71 passes. The disc tray 71 has a front panel 71a at the front end (left end in FIG. 18B) in the direction of loading/unloading an optical disc 100 (in the lateral direction in FIG. 18B). The front panel 71a is arranged so as to close the slot 2b in a state in which the optical disc 100 is loaded in the chassis 2.

According to the present embodiment, the external antenna 6a is a loop. The external antenna 6a is arranged inside the front panel 71a such that an axis 300 of the loop extends in the lateral direction in FIG. 18B.

In the present embodiment, a plane defined by the external antenna 6a is approximately orthogonal to a plane defined by an internal antenna 9. Therefore, the direction of a magnetic field generated by the internal antenna 9 is different from that of a magnetic field generated by the external antenna 6a. Thus, the magnetic fields hardly affect each other, thus preventing a malfunction of the optical disc recording and reproducing apparatus 1a.

The optical disc recording and reproducing apparatus 1a according to the fourth embodiment has the same advantages as those of the optical disc recording and reproducing apparatus 1 according to the first embodiment. When the optical disc recording and reproducing apparatus 1a is built in, for example, a personal computer (PC), only the front panel 71a is generally exposed. Since the external antenna 6a is disposed inside the front panel 71a, the optical disc recording and reproducing apparatus 1a can easily communicate with an noncontact IC card 200.

An optical disc recording and reproducing apparatus according to a fifth embodiment of the present invention will now be described.

The difference between the optical disc recording and reproducing apparatus according to the fifth embodiment and that according to the foregoing fourth embodiment will be mainly described. A description of matters similar to those of the fourth embodiment is omitted.

Figure 19A:
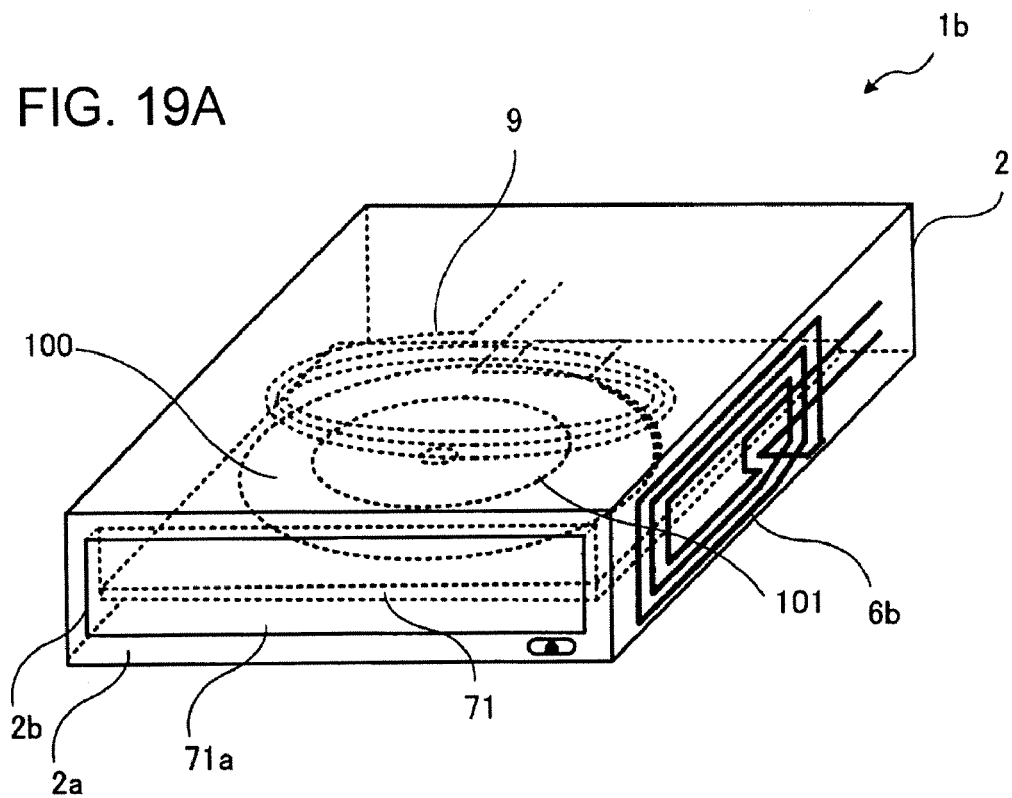
FIG. 19A is a perspective view of an optical disc recording and reproducing apparatus according to a fifth embodiment of the present invention.
Figure 19B:
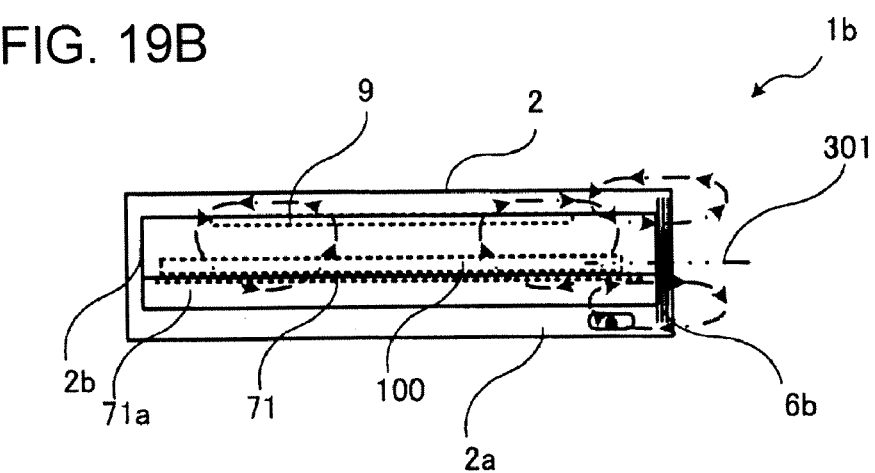
FIG. 19B is a side view of the optical disc recording and reproducing apparatus according to the fifth embodiment.

FIG. 19A is a perspective view of an optical disc recording and reproducing apparatus 1b according to the fifth embodiment. FIG. 19B is a front view thereof. In FIGS. 19A and 19B, an external antenna 6b is exaggerated.

The optical disc recording and reproducing apparatus 1b according to the fifth embodiment has the same structure as that according to the fourth embodiment except for the arrangement of the external antenna 6b.

According to the present embodiment, the external antenna 6b is a loop. The external antenna 6b is arranged inside a side wall of a chassis 2 such that an axis 301 of the loop extends in the lateral direction in FIG. 19B.

In the present embodiment, a plane defined by the external antenna 6b is approximately orthogonal to a plane defined by an internal antenna 9. Therefore, the direction of a magnetic field generated by the internal antenna 9 is different from that generated by the external antenna 6b. Thus, the magnetic fields hardly affect each other, thus preventing a malfunction of the optical disc recording and reproducing apparatus 1b.

The optical disc recording and reproducing apparatus 1b according to the fifth embodiment has the same advantages as those of the optical disc recording and reproducing apparatus 1a according to the fourth embodiment.

Having described the preferred embodiments of the present invention referring to the accompanying drawings, it should be understood that the present invention is not limited and a component of each unit could be replaced with any component having the same function. Further, any other component or step may be added without departing from the spirit and scope of the present invention.

In addition, structures (features) according to any two or more of the above-described embodiments may be combined.

In each of the embodiments, the shape of a material including the IC chip 201 is card-shaped, i.e., the noncontact IC card 200 is used. The present invention is not limited to this example.

In each of the above-described embodiments, the external antenna 6 (6a, 6b), the internal antenna 9, and the reader/writer controller 10 operate at only one communication frequency of 13.56 MHz. The present invention is not limited to this example. An internal antenna and an external antenna may be arranged so that communication can be performed using two or more frequencies and two or more reader/writer controllers suitable for the respective frequencies may be disposed such that each controller independently selects the internal antenna or the external antenna.

In each of the above-described embodiments, the optical disc recording and reproducing apparatus capable of recording data on an optical disc and reproducing data recorded on an optical disc has been described. The present invention is applicable to an optical disc player having a reproducing function only.

In each of the above-described embodiments, the antennas for electromagnetic induction using a communication frequency of 13.56 MHz have been described. The present invention is not limited to this example. Communication (using electromagnetic radiation) within a frequency band of 900 MHz or 2.4 GHz may be used. In this case, a dipole antenna may be used instead of the foregoing coil antenna. The dipole antenna may be linear, bent, or curved.

In the use of the communication (using electromagnetic radiation) within a frequency band of 900 MHz or 2.4 GHz, a material for a casing may have the effect of shielding against radio waves. For example, assuming that a communication frequency band is 2.4 GHz, the conductivity or electromagnetic-wave absorptivity of a material for the casing is more important than the permeability in shielding against the waves. Accordingly, various conductors, such as copper, iron, aluminum, silver, or gold, may be used. Furthermore, in the casing, the shape of each of part corresponding to the external antenna and part corresponding to the internal antenna is not limited to a plate (or a bent plate or a box obtained using the plate). Each part may have a mesh structure.

In the use of the communication (using electromagnetic radiation) within a frequency band of 900 MHz or 2.4 GHz, a material for a high permeability material is different from that described above. In the use of a high frequency, e.g., an ultra high frequency (UHF) or higher, it is preferred that an insulating material exhibiting low dielectric loss be used. Examples of a high permeability material under ultra high or higher frequency conditions include various polymeric materials, such as polyethylene, Teflon (registered trademark), epoxy, foamed polyethylene, and foamed Teflon (registered trademark).

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc recording and reproducing apparatus for communicating with a noncontact integrated circuit, comprising:
   a chassis;
   an external antenna to communicate with an external noncontact integrated circuit located outside the chassis;
   an internal antenna to communicate with an internal noncontact integrated circuit included in an optical disc loaded in the chassis;
   a shield to intercept electromagnetic waves generated from the external and internal antennas to prevent interference among the electromagnetic waves during communication;
   control means for searching for the external noncontact integrated circuit and the internal noncontact integrated circuit; and
   switching means for
      changing to a conduction state between the external antenna and the control means to search for the external noncontact integrated circuit, the control means communicating with the external noncontact integrated circuit via the external antenna, and
      changing to a conduction state between the internal antenna and the control means to search for the internal noncontact integrated circuit, the control means communicating with the internal noncontact integrated circuit via the internal antenna.

2. The apparatus according to claim 1, wherein a search operation is performed during reproduction of content recorded on the optical disc or recording of content to the optical disc.

3. The apparatus according to claim 1, wherein the control means controls the switching means to change conduction states between a first mode in which the control means is in conduction with the external antenna or the internal antenna and a second mode in which the control means is in conduction with the external and internal antennas, to perform communication.

4. The apparatus according to claim 3, wherein the switching means includes at least one impedance matching circuit to match the impedance of the external and internal antennas in the second mode to the impedance of the external or internal antenna in the first mode.

5. The apparatus according to claim 1, wherein the external antenna is opposed to the internal antenna with the shield therebetween.

6. The apparatus according to claim 5, wherein the external antenna and internal antenna are fixed on opposite sides of the shield.

7. The apparatus according to claim 1, wherein a high permeability material is arranged between the external antenna and the shield and another high permeability material is arranged between the internal antenna and the shield.

8. The apparatus according to claim 1, wherein the external and internal antennas define respective planes, a plane defined by the external antenna being orthogonal to a plane defined by the internal antenna.

9. The apparatus according to claim 1, wherein the power output of the external antenna is greater than the power output of the internal antenna when communicating.

10. The apparatus according to claim 1, wherein the optical disc, the external noncontact integrated circuit and the internal noncontact integrated circuit store identification information.

11. The apparatus according to claim 10, wherein the control means compares the identification information of internal noncontact integrated circuit and the optical disc to determine authenticity of the optical disc.

12. The apparatus according to claim 10, wherein the control means compares the identification information of the internal noncontact integrated circuit, the external noncontact integrated circuit and the optical disc to determine authenticity of the external noncontact integrated circuit.

13. The apparatus according to claim 1, wherein a search operation is performed during intervals between reproducing of content recorded on the optical disc or recording of content to the optical disc.

14. An optical disc recording and reproducing apparatus for communicating with a noncontact integrated circuit, comprising:
   a chassis;
   an external antenna to communicate with an external noncontact integrated circuit located outside the chassis;
   an internal antenna to communicate with an internal noncontact integrated circuit included in an optical disc loaded in the chassis;
   a shield to intercept electromagnetic waves generated from the external and internal antennas to prevent interference among the electromagnetic waves during communication;
   a control section configured to search for the external noncontact integrated circuit and the internal noncontact integrated circuit; and
   a switching section configured to
      change to a conduction state between the external antenna and the control section to search for the external noncontact integrated circuit, the control section communicating with the external noncontact integrated circuit via the external antenna, and
      change to a conduction state between the internal antenna and the control section to search for the internal noncontact integrated circuit, the control section communicating with the internal noncontact integrated circuit via the internal antenna.

15. An optical disc recording and reproducing method for communicating with a noncontact integrated circuit, comprising:

communicating, at an external antenna, with an external noncontact integrated circuit located outside of a chassis;
communicating, at an internal antenna, with an internal noncontact integrated circuit included in an optical disc loaded in the chassis;
intercepting, at a shield, electromagnetic waves generated from the external and internal antennas to prevent interference among the electromagnetic waves during communication;
searching, at a control section, for the external noncontact integrated circuit and the internal noncontact integrated circuit; and switching, at a switching section, to a conduction state between the external antenna and the control section to search for the external noncontact integrated circuit, the control section communicating with the external noncontact integrated circuit via the external antenna; and
switching, at the switching section, to a conduction state between the internal antenna and the control section to search for the internal noncontact integrated circuit, the control section communicating with the internal noncontact integrated circuit via the internal antenna.

* * * * *